United States Patent
Aflaki Beni et al.

(10) Patent No.: US 11,651,523 B2
(45) Date of Patent: May 16, 2023

(54) APPARATUS, A METHOD AND A COMPUTER PROGRAM FOR VOLUMETRIC VIDEO

(71) Applicant: Nokia Technologies Oy, Espoo (FI)

(72) Inventors: Payman Aflaki Beni, Tampere (FI); Sebastian Schwarz, Unterhaching (DE)

(73) Assignee: Nokia Technologies Oy, Espoo (FI)

( * ) Notice: Subject to any disclaimer, the term of this patent is extended or adjusted under 35 U.S.C. 154(b) by 408 days.

(21) Appl. No.: 16/956,683

(22) PCT Filed: Dec. 14, 2018

(86) PCT No.: PCT/FI2018/050927
§ 371 (c)(1),
(2) Date: Jun. 22, 2020

(87) PCT Pub. No.: WO2019/129919
PCT Pub. Date: Jul. 4, 2019

(65) Prior Publication Data
US 2020/0327703 A1  Oct. 15, 2020

(30) Foreign Application Priority Data
Dec. 28, 2017 (FI) .................................. 20176175

(51) Int. Cl.
*G06T 9/00* (2006.01)
*H04N 19/176* (2014.01)
(Continued)

(52) U.S. Cl.
CPC .................. *G06T 9/20* (2013.01); *G06T 9/40* (2013.01); *H04N 19/115* (2014.11); *H04N 19/176* (2014.11)

(58) Field of Classification Search
CPC .. H04N 13/239; H04N 19/176; H04N 13/243; H04N 19/597; H04N 19/115;
(Continued)

(56) References Cited

U.S. PATENT DOCUMENTS

| 8,385,599 B2 | 2/2013 | Camus et al. |
| 9,286,538 B1 | 3/2016 | Chen et al. |

(Continued)

FOREIGN PATENT DOCUMENTS

| EP | 1321894 A2 | 6/2003 |
| WO | 2018/034253 A1 | 2/2018 |

OTHER PUBLICATIONS

Extended European Search Report received for corresponding European Patent Application No. 18896449.8, dated Mar. 30, 2021, 10 pages.

(Continued)

*Primary Examiner* — Tsion B Owens
(74) *Attorney, Agent, or Firm* — Joseph C. Drish; Harrington & Smith

(57) ABSTRACT

There are disclosed various methods, apparatuses and computer program products for volumetric video encoding and decoding. In some embodiments, two or more patches formed from a three-dimensional image information are obtained, each patch representing projection data of at least a part of an object to a projection plane. A rectangle totally covering the patch is determining for each of the two or more patches. A sorting criteria is determined on the basis of a width and a height of the rectangle. The patches are sorted on the basis of the sorting criteria of the rectangles determined for the two or more patches. An initial size of a grid is selected on the basis of one or more of the largest rectangles; and the two or more patches are inserted into the grid. The grid is encoded into a bitstream.

20 Claims, 12 Drawing Sheets

(51) Int. Cl.
G06T 9/20 (2006.01)
H04N 19/115 (2014.01)
G06T 9/40 (2006.01)

(58) Field of Classification Search
CPC ........... H04N 13/275; G06T 9/20; G06T 9/00; G06T 9/40
See application file for complete search history.

(56) References Cited

U.S. PATENT DOCUMENTS

| | | | |
|---|---|---|---|
| 10,699,444 B2* | 6/2020 | Mammou | G06T 7/50 |
| 10,789,733 B2* | 9/2020 | Mammou | H04N 19/172 |
| 2004/0145593 A1 | 7/2004 | Berkner et al. | |
| 2005/0151733 A1 | 7/2005 | Sander et al. | |
| 2012/0050337 A1 | 3/2012 | Raffman et al. | |
| 2014/0334670 A1 | 11/2014 | Guigues et al. | |
| 2015/0046456 A1 | 2/2015 | Hernandez Londono et al. | |
| 2015/0346922 A1 | 12/2015 | Robertson | |
| 2017/0221263 A1 | 8/2017 | Wei et al. | |
| 2019/0156520 A1* | 5/2019 | Mammou | G08B 1/00 |

OTHER PUBLICATIONS

Cohen et al., "Representation and coding of large-scale 3D dynamic maps", Proceedings of Spie, dated Sep. 27, 2016, pp. 1-8.
Mammou et al., "Point Cloud Compression: Test Model Category 2 version 0.0", Apple Inc, ISO/IEC JTC1/SC29/WG1 1, m41920, Oct. 2017, 7 pages.
Cohen et al., "Compression of 3-D Point Clouds using Hierarchical Patch Fitting", IEEE International Conference on Image Processing (ICIP), Sep. 17-20, 2017, pp. 4033-4037.
"Information Technology—Dynamic Adaptive Streaming Over HTTP (DASH)—Part 1: Media Presentation Description and Segment Formats", ISO/IEC 23009-1, May 15, 2014, 152 pages.
Office action received for corresponding Finnish Patent Application No. 20176175, dated Jul. 30, 2018, 8 pages.
Mammou, "PCC Test Model Category 2 v0", 3DG, ISO/IEC JTC1/SC29/WG11, N17248, Oct. 2017, 12 pages.
Fukatsu et al., "An Efficient Method for Checking Overlaps and Construction Algorithms for the Bitmap Shape Packing Problem", IEEE International Conference on Industrial Engineering and Engineering Management, Dec. 9-12, 2014, pp. 1056-1060.
International Search Report and Written Opinion received for corresponding Patent Cooperation Treaty Application No. PCT/FI2018/050927, dated Mar. 27, 2019, 15 pages.
Huang et al., "Optimal Packing of High-Precision Rectangles", Proceedings of the Twenty-Fifth AAAI Conference on Artificial Intelligence, Aug. 7, 2011, pp. 42-47.

* cited by examiner

APPARATUS, A METHOD AND A COMPUTER PROGRAM FOR VOLUMETRIC VIDEO

RELATED APPLICATION

This application claims priority to PCT Application No. PCT/FI2018/050927, filed on Dec. 14, 2018, which claims priority to Finland Patent Application No. 20176175, filed on Dec. 28, 2017, each of which is incorporated herein by reference in its entirety.

TECHNICAL FIELD

The present invention relates to an apparatus, a method and a computer program for volumetric video coding and decoding.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

Volumetric video data represents a three-dimensional scene or object and can be used as input for virtual reality (VR), augmented reality (AR) and mixed reality (MR) applications. Such data describes the geometry attribute, e.g. shape, size, position in three-dimensional (3D) space, and respective attributes, e.g. colour, opacity, reflectance and any possible temporal changes of the geometry attribute and other attributes at given time instances. Volumetric video is either generated from 3D models through computer-generated imagery (CGI), or captured from real-world scenes using a variety of capture solutions, e.g. multi-camera, laser scan, combination of video and dedicated depth sensors, and more. Also, a combination of CGI and real-world data is possible.

Typical representation formats for such volumetric data are triangle meshes, point clouds (PCs), or voxel arrays. Temporal information about the scene can be included in the form of individual capture instances, i.e. "frames" in 2D video, or other means, e.g. position of an object as a function of time.

Identifying correspondences for motion-compensation in 3D-space may be an ill-defined problem, as both the geometry and respective attributes may change. For example, temporal successive "frames" do not necessarily have the same number of meshes, points or voxel. Therefore, compression of dynamic 3D scenes may be inefficient. 2D-video based approaches for compressing volumetric data, i.e. multiview+depth, may have better compression efficiency, but rarely cover the full scene. Therefore, they provide only limited six degrees of freedom (6DOF) capabilities.

Because volumetric video describes a 3D scene (or object), such data can be viewed from any viewpoint. Therefore, volumetric video may be an important format for any AR, VR, or MR applications, especially for providing 6DOF viewing capabilities.

The above mentioned volumetric video representation formats suffer from poor spatial and temporal coding performance.

There is, therefore, a need for solutions for improved coding of volumetric video.

SUMMARY

Now there has been invented an improved method and technical equipment implementing the method, by which the above problems are alleviated. Various aspects of the invention include a method, an apparatus (an encoder and/or a decoder), a system and a computer readable medium comprising a computer program or a signal stored therein, which are characterized by what is stated in the independent claims. Various details of the invention are disclosed in the dependent claims and in the corresponding images and description.

A volumetric video may comprise three-dimensional scenes represented as, for example, dynamic point clouds, arrays of voxels or mesh models or a combination of such. The three-dimensional scenes may be projected onto a number of projection surfaces having simple geometries, for example sphere(s), cylinder(s), cube(s), polyhedron(s) and/or plane(s). In this context, a projection surface may be a piece-wise continuous and smooth surface in three-dimensional space. Piece-wise smoothness may be understood so that there are regions of the surface where the direction of the surface normal does not change abruptly (i.e. the values of the coefficients of the surface normal's coordinate components are continuous). A projection surface may comprise pieces of simple geometric surfaces. A projection surface may also evolve (change) over time. On such surfaces, the texture and geometry of point clouds, voxel arrays or mesh models may form pixel images, e.g. texture images and depth images (indicative of distance from the projection surface). These two images represent the same object projected onto the same geometry, therefore object boundaries are aligned in texture and depth image.

Such projection surfaces may be unfolded onto two-dimensional (2D) planes, e.g. resulting in a two-dimensional pixel image. Standard 2D video coding may be applied for each projection to code the pixel information resulting from the texture data. In connection with the texture information, relevant projection geometry information (geometry attributes), comprising e.g. projection or projection surface type, location and orientation of the projection surface in 3D space, and/or size of the projection surface, may be transmitted either in the same bitstream or separately along with the bitstream. At the receiver side, the bitstream may be decoded and volumetric video may be reconstructed from decoded 2D projections and projection geometry information.

Two-dimensional images may be projected from different parts of scene objects to form several patches. Such patches may be projections onto one of three orthogonal planes (front, side, top). Patches are derived by analysing surface normal and clustering related 3D data points. The projection plane for each such patch is the one of the above mentioned three planes with the closest surface normal to the average patch normal. All patches may be packed into a 2D grid for compression. For each patch a 3D vector is signalled to specify the patch location in 3D space for reprojection at the decoder side.

Such patches may be gathered together to create a 2D grid which will later be encoded using conventional video codecs. The creation of this 2D grid may not decrease the size of grid and fully use the available pixels. Therefore, in accordance with some approaches there is provided a method to better assign locations for the patches to reduce the amount of bitrate required to encode the 2D grid. Keeping the 2D grid to the minimum required size might provide small benefits in terms of coding efficiency. Current video coding technology is very good in encoding empty areas. However, it may bring large benefits in terms of required video buffer size. As buffer memory, especially at the decoder, may come at a high cost, optimised patch packing is desired.

In accordance with an embodiment, there is provided an algorithm to put the patches together to create a 2D grid which has a minimized area. Each patch may be presented with a rectangle with width and height of W and H, respectively. The packing will start to sort the patches from the patch having the largest area to the patch having the smallest area (W×H). A preliminary grid size is defined based on the width and height of the two largest patches (see FIG. 8a). Then, putting the largest patch horizontally (when it is considered to be a rectangle) on the top of the grid and the second largest patch vertically on the left. The same process continues with the following patches in the sorted list and exceptions are dealt with when the any patch size is larger than the size of the current grid.

Some embodiments provide a method for encoding and decoding volumetric video information. In some embodiments of the present invention there is provided a method, apparatus and computer program product for volumetric video coding as well as decoding.

Various aspects of examples of the invention are provided in the detailed description.

According to a first aspect, there is provided a method comprising:

obtaining two or more patches formed from a three-dimensional image information, each patch representing projection data of at least a part of an object to a projection plane;

determining for each of the two or more patches a rectangle totally covering the patch;

determining a sorting criteria on the basis of a width and a height of the rectangle;

sorting the patches on the basis of the sorting criteria of the rectangles determined for the two or more patches;

selecting an initial size of a grid on the basis of one or more of the largest rectangles;

inserting the two or more patches into the grid; and encoding the grid into a bitstream.

An apparatus according to a second aspect comprises at least one processor and at least one memory, said at least one memory stored with code thereon, which when executed by said at least one processor, causes the apparatus to perform at least:

obtain two or more patches formed from a three-dimensional image information, each patch representing projection data of at least a part of an object to a projection plane;

determine for each of the two or more patches a rectangle totally covering the patch;

determine a sorting criteria on the basis of a width and a height of the rectangle;

sort the patches on the basis of the sorting criteria of the rectangles determined for the two or more patches;

select an initial size of a grid on the basis of one or more of the largest rectangles;

insert the two or more patches into the grid; and encode the grid into a bitstream.

A computer readable storage medium according to a third aspect comprises code for use by an apparatus, which when executed by a processor, causes the apparatus to perform:

obtain two or more patches formed from a three-dimensional image information, each patch representing projection data of at least a part of an object to a projection plane;

determine for each of the two or more patches a rectangle totally covering the patch;

determine a sorting criteria on the basis of a width and a height of the rectangle;

sort the patches on the basis of the sorting criteria of the rectangles determined for the two or more patches;

select an initial size of a grid on the basis of one or more of the largest rectangles;

insert the two or more patches into the grid; and encode the grid into a bitstream.

An apparatus according to a fourth aspect comprises:

means for obtaining two or more patches formed from a three-dimensional image information, each patch representing projection data of at least a part of an object to a projection plane;

means for determining for each of the two or more patches a rectangle totally covering the patch;

means for determining a sorting criteria on the basis of a width and a height of the rectangle;

means for sorting the patches on the basis of the sorting criteria of the rectangles determined for the two or more patches;

means for selecting an initial size of a grid on the basis of one or more of the largest rectangles;

means for inserting the two or more patches into the grid; and means for encoding the grid into a bitstream.

According to a fifth aspect, there is provided a method comprising:

receiving a bitstream comprising a grid filled with two or more patches formed from a three-dimensional image information, each patch representing projection data of at least a part of an object to a projection plane;

decoding from the bitstream information of the grid and the two or more patches;

reconstructing the grid;

reconstructing the two of more patches from the grid; and reconstructing three-dimensional image from the two or more patches.

An apparatus according to a sixth aspect comprises at least one processor and at least one memory, said at least one memory stored with code thereon, which when executed by said at least one processor, causes the apparatus to perform at least:

decode from the bitstream information of the grid and the two or more patches;

reconstruct the grid;

reconstruct the two of more patches from the grid; and reconstruct three-dimensional image from the two or more patches.

A computer readable storage medium according to a seventh aspect comprises code for use by an apparatus, which when executed by a processor, causes the apparatus to perform:

decode from the bitstream information of the grid and the two or more patches;

reconstruct the grid;

reconstruct the two of more patches from the grid; and reconstruct three-dimensional image from the two or more patches.

An apparatus according to an eighth aspect comprises:

means for decoding from the bitstream information of the grid and the two or more patches;

means for reconstructing the grid;

means for reconstructing the two of more patches from the grid; and means for reconstructing three-dimensional image from the two or more patches.

Further aspects include at least apparatuses and computer program products/code stored on a non-transitory memory medium arranged to carry out the above methods.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

In the following, several embodiments of the invention will be described in the context of point cloud, voxel or mesh scene models for three-dimensional volumetric video and pixel and picture based two-dimensional video coding. It is to be noted, however, that the invention is not limited to specific scene models or specific coding technologies. In fact, the different embodiments have applications in any environment where coding of volumetric scene data is required.

Point clouds are commonly used data structures for storing volumetric content. Compared to point clouds, sparse voxel octrees describe a recursive subdivision of a finite volume with solid voxels of varying sizes, while point clouds describe an unorganized set of separate points limited only by the precision of the used coordinate values.

A volumetric video frame is a sparse voxel octree or a point cloud that models the world at a specific point in time, similar to a frame in a 2D video sequence. Voxel or point attributes contain information like colour, opacity, surface normal vectors, and surface material properties. These are referenced in the sparse voxel octrees (e.g. colour of a solid voxel) or point clouds, but can also be stored separately.

When encoding a volumetric video, each frame may produce several hundred megabytes or several gigabytes of voxel data which needs to be converted to a format that can be streamed to the viewer, and rendered in real-time. The amount of data depends on the world complexity and the number of cameras. The larger impact comes in a multi-device recording setup with a number of separate locations where the cameras are recording Such a setup produces more information than a camera at a single location.

Figure 1:
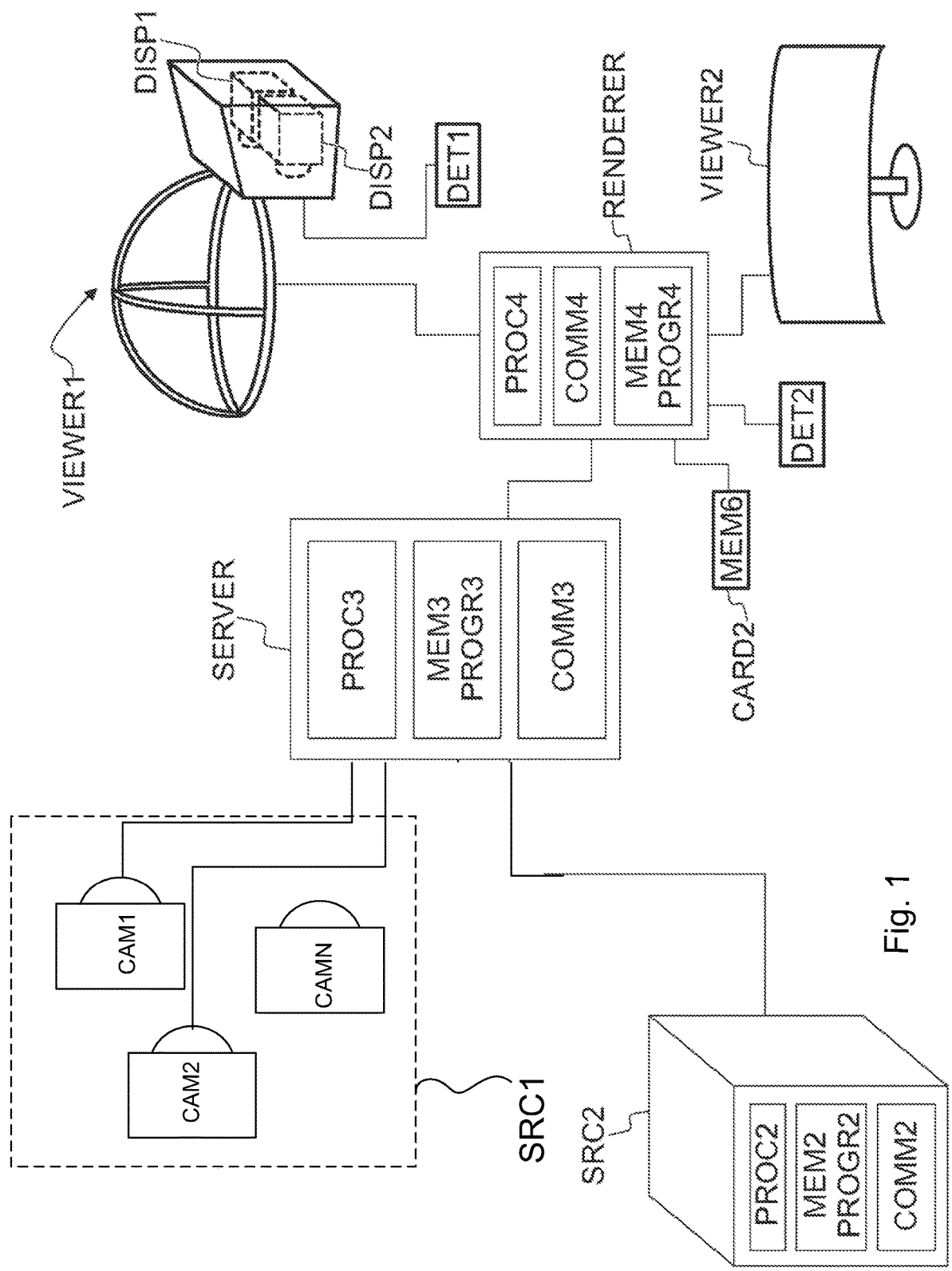
FIG. 1 shows a system for capturing, encoding, decoding, reconstructing and viewing a three-dimensional scheme.

FIG. 1 shows a system for capturing, encoding, decoding, reconstructing and viewing a three-dimensional scheme, that is, for 3D video and 3D audio digital creation and playback. The task of the system is that of capturing sufficient visual and auditory information from a specific scene to be able to create a scene model such that a convincing reproduction of the experience, or presence, of being in that location can be achieved by one or more viewers physically located in different locations and optionally at a time later in the future. Such reproduction requires more information that can be captured by a single camera or microphone, in order that a viewer can determine the distance and location of objects within the scene using their eyes and their ears. To create a pair of images with disparity, two camera sources are used. In a similar manner, for the human auditory system to be able to sense the direction of sound, at least two microphones are used (the commonly known stereo sound is created by recording two audio channels). The human auditory system can detect the cues, e.g. in timing difference of the audio signals to detect the direction of sound.

The system of FIG. 1 may consist of three main parts: image sources, a server and a rendering device. A video source SRC1 may comprise multiple cameras CAM1, CAM2, . . . , CAMN with overlapping field of view so that regions of the view around the video capture device is captured from at least two cameras. The video source SRC1 may comprise multiple microphones to capture the timing and phase differences of audio originating from different directions. The video source SRC1 may comprise a high-resolution orientation sensor so that the orientation (direction of view) of the plurality of cameras CAM1, CAM2, . . . , CAMN can be detected and recorded. The cameras or the computers may also comprise or be functionally connected to means for forming distance information corresponding to the captured images, for example so that the pixels have corresponding depth data. Such depth data may be formed by scanning the depth or it may be computed from the different images captured by the cameras. The video source SRC1 comprises or is functionally connected to, or each of the plurality of cameras CAM1, CAM2, . . . , CAMN comprises or is functionally connected to a computer processor and memory, the memory comprising computer program code for controlling the source and/or the plurality of cameras. The image stream captured by the video source, i.e. the plurality of the cameras, may be stored on a memory device for use in another device, e.g. a viewer, and/or transmitted to a server using a communication interface. It needs to be understood that although a video source comprising three cameras is described here as part of the system, another amount of camera devices may be used instead as part of the system.

Alternatively, or additionally to the source device SRC1 creating information for forming a scene model, one or more sources SRC2 of synthetic imagery may be present in the system, comprising a scene model. Such sources may be used to create and transmit the scene model and its development over time, e.g. instantaneous states of the model. The model can be created or provided by the source SRC1 and/or SRC2, or by the server SERVER. Such sources may also use the model of the scene to compute various video bitstreams for transmission.

One or more two-dimensional video bitstreams may be computed at the server SERVER or a device RENDERER used for rendering, or another device at the receiving end. When such computed video streams are used for viewing, the viewer may see a three-dimensional virtual world as described in the context of FIGS. 4a-4d. The devices SRC1 and SRC2 may comprise or be functionally connected to one or more computer processors (PROC2 shown) and memory (MEM2 shown), the memory comprising computer program (PROGR2 shown) code for controlling the source device SRC1/SRC2. The image stream captured by the device and the scene model may be stored on a memory device for use in another device, e.g. a viewer, or transmitted to a server or the viewer using a communication interface COMM2. There may be a storage, processing and data stream serving network in addition to the capture device SRC1. For example, there may be a server SERVER or a plurality of servers storing the output from the capture device SRC1 or device SRC2 and/or to form a scene model from the data from devices SRC1, SRC2. The device SERVER comprises or is functionally connected to a computer processor PROC3 and memory MEM3, the memory comprising computer program PROGR3 code for controlling the server. The device SERVER may be connected by a wired or wireless network connection, or both, to sources SRC1 and/or SRC2, as well as the viewer devices VIEWER1 and VIEWER2 over the communication interface COMM3.

The creation of a three-dimensional scene model may take place at the server SERVER or another device by using the images captured by the devices SRC1. The scene model may be a model created from captured image data (a real-world model), or a synthetic model such as on device SRC2, or a combination of such. As described later, the scene model may be encoded to reduce its size and transmitted to a decoder, for example viewer devices.

For viewing the captured or created video content, there may be one or more viewer devices VIEWER1 and VIEWER2. These devices may have a rendering module and a display module, or these functionalities may be combined in a single device. The devices may comprise or be functionally connected to a computer processor PROC4 and memory MEM4, the memory comprising computer program PROG4 code for controlling the viewing devices. The viewer (playback) devices may consist of a data stream receiver for receiving a video data stream and for decoding the video data stream. The video data stream may be received from the server SERVER or from some other entity, such as a proxy server, an edge server of a content delivery network, or a file available locally in the viewer device. The data stream may be received over a network connection through communications interface COMM4, or from a memory device MEM6 like a memory card CARD2. The viewer devices may have a graphics processing unit for processing of the data to a suitable format for viewing. The viewer VIEWER1 may comprise a high-resolution stereo-image head-mounted display for viewing the rendered stereo video sequence. The head-mounted display may have an orientation sensor DET1 and stereo audio headphones. The viewer VIEWER2 may comprise a display (either two-dimensional or a display enabled with 3D technology for displaying stereo video), and the rendering device may have an orientation detector DET2 connected to it. Alternatively, the viewer VIEWER2 may comprise a 2D display, since the volumetric video rendering can be done in 2D by rendering the viewpoint from a single eye instead of a stereo eye pair.

It needs to be understood that FIG. 1 depicts one SRC1 device and one SRC2 device, but generally the system may comprise more than one SRC1 device and/or SRC2 device.

Any of the devices (SRC1, SRC2, SERVER, RENDERER, VIEWER1, VIEWER2) may be a computer or a portable computing device, or be connected to such or configured to be connected to such. Moreover, even if the devices (SRC1, SRC2, SERVER, RENDERER, VIEWER1, VIEWER2) are depicted as a single device in FIG. 1, they may comprise multiple parts or may be comprised of multiple connected devices. For example, it needs to be understood that SERVER may comprise several devices, some of which may be used for editing the content produced by SRC1 and/or SRC2 devices, some others for compressing the edited content, and a third set of devices may be used for transmitting the compressed content. Such devices may have computer program code for carrying out methods according to various examples described in this text.

Figure 2A:
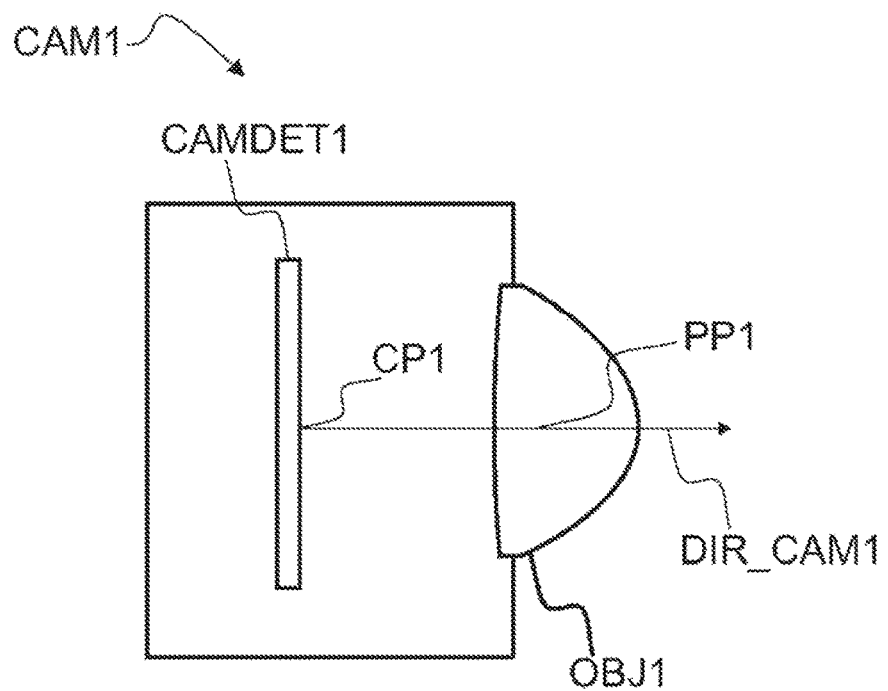
FIGS. 2a and 2b show a capture device and a viewing device.
Figure 2B:
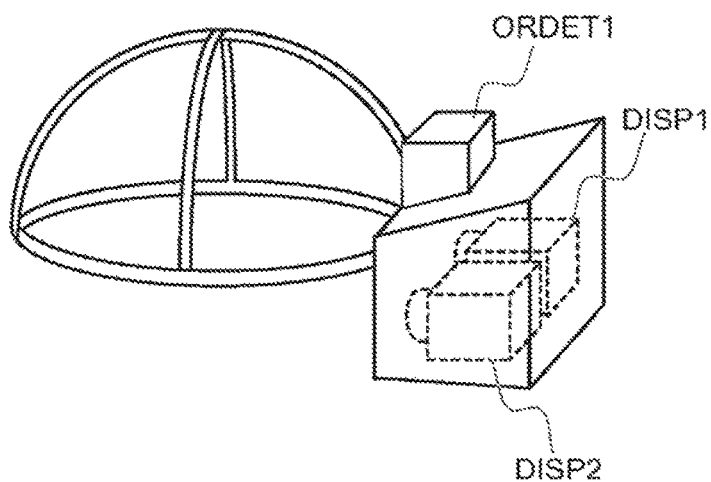

FIGS. 2a and 2b show a capture device and a viewing device, respectively. FIG. 2a illustrates a camera CAM1. The camera has a camera detector CAMDET1, comprising a plurality of sensor elements for sensing intensity of the light hitting the sensor element. The camera has a lens OBJ1 (or a lens arrangement of a plurality of lenses), the lens being positioned so that the light hitting the sensor elements travels through the lens to the sensor elements. The camera detector CAMDET1 has a nominal centre point CP1 that is a middle point of the plurality of sensor elements, for example for a rectangular sensor the crossing point of diagonals of the rectangular sensor. The lens has a nominal centre point PP1, as well, lying for example on the axis of symmetry of the lens. The direction of orientation of the camera is defined by the line passing through the centre point CP1 of the camera sensor and the centre point PP1 of the lens. The direction of the camera is a vector along this line pointing in the direction from the camera sensor to the lens. The optical axis of the camera is understood to be this line CP1-PP1. However, the optical path from the lens to the camera detector need not always be a straight line but there may be mirrors and/or some other elements which may affect the optical path between the lens and the camera detector.

FIG. 2b shows a head-mounted display (HMD) for stereo viewing. The head-mounted display comprises two screen sections or two screens DISP1 and DISP2 for displaying the left and right eye images. The displays are close to the eyes, and therefore lenses are used to make the images easily viewable and for spreading the images to cover as much as possible of the eyes' field of view. When the device will be used by a user, the user may put the device on her/his head so that it will be attached to the head of the user so that it stays in place even when the user turns his head. The device may have an orientation detecting module ORDET1 for determining the head movements and direction of the head. The head-mounted display gives a three-dimensional (3D) perception of the recorded/streamed content to a user.

The system described above may function as follows. Time-synchronized video and orientation data is first recorded with the capture devices. This can consist of multiple concurrent video streams as described above. One or more time-synchronized audio streams may also be recorded with the capture devices. The different capture devices may form image and geometry information of the scene from different directions. For example, there may be three, four, five, six or more cameras capturing the scene from different sides, like front, back, left and right, and/or at directions between these, as well as from the top or bottom, or any combination of these. The cameras may be at different distances, for example some of the cameras may capture the whole scene and some of the cameras may be capturing one or more objects in the scene. In an arrangement used for capturing volumetric video data, several cameras may be directed towards an object, looking onto the object from different directions, where the object is e.g. in the middle of the cameras. In this manner, the texture and geometry of the scene and the objects within the scene may be captured adequately. As mentioned earlier, the cameras or the system may comprise means for determining geometry information, e.g. depth data, related to the captured video streams. From these concurrent video and audio streams, a computer model of a scene may be created. Alternatively, or additionally, a synthetic computer model of a virtual scene may be used. The models (at successive time instances) are then transmitted immediately or later to the storage and processing network for processing and conversion into a format suitable for subsequent delivery to playback devices. The conversion may involve processing and coding to improve the quality and/or reduce the quantity of the scene model data while preserving the quality at a desired level. Each playback device receives a stream of the data (either computed video data or scene model data) from the network, and renders it into a viewing reproduction of the original location which can be experienced by a user. The reproduction may be two-dimensional or three-dimensional (stereo image pairs).

Figure 3A:
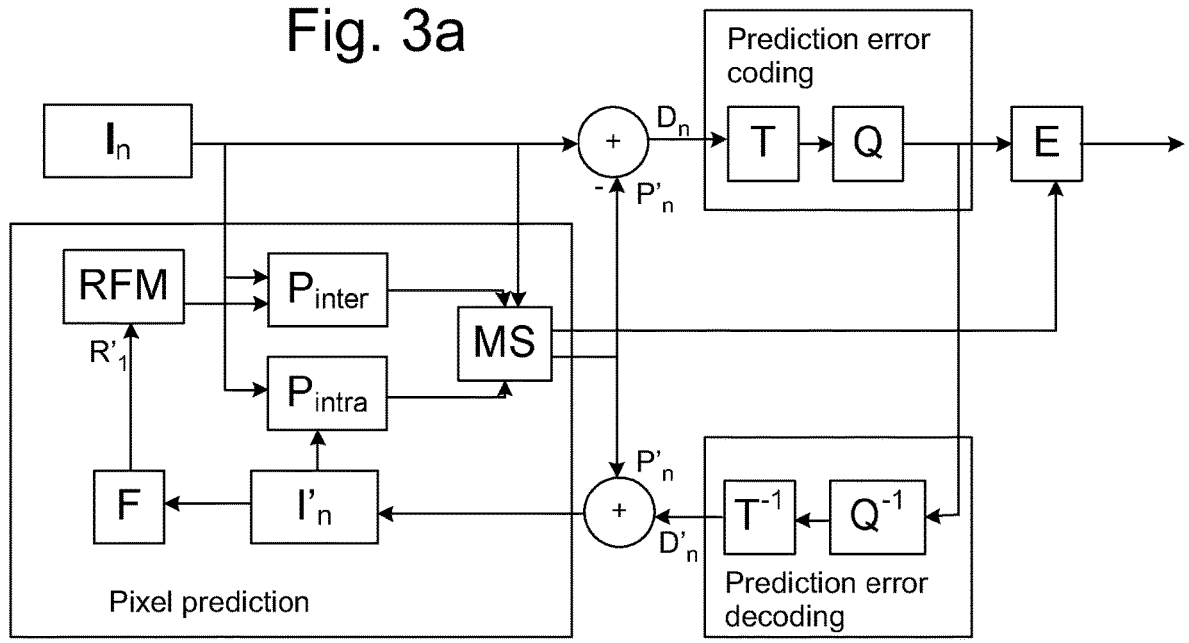
FIGS. 3a and 3b show an encoder and decoder for encoding and decoding texture pictures, geometry pictures and/or auxiliary pictures.
Figure 3B:
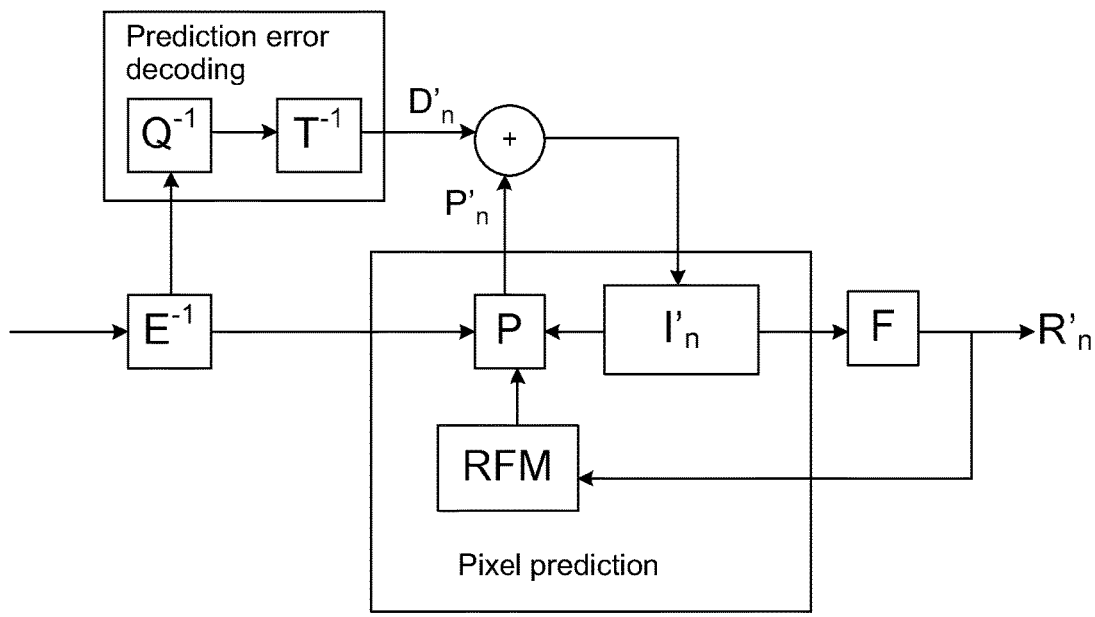

FIGS. 3a and 3b show an encoder and decoder for encoding and decoding texture pictures, geometry pictures and/or auxiliary pictures. A video codec consists of an encoder that transforms an input video into a compressed representation suited for storage/transmission and a decoder that can uncompress the compressed video representation back into a viewable form. Typically, the encoder discards and/or loses some information in the original video sequence in order to represent the video in a more compact form (that is, at lower bitrate). An example of an encoding process is illustrated in FIG. 3a. FIG. 3a illustrates an image to be encoded (I″); a predicted representation of an image block (P′″); a prediction error signal (D″); a reconstructed prediction error signal (D′″); a preliminary reconstructed image (I′″); a final reconstructed image (R′″); a transform (T) and inverse transform ($T^{-1}$); a quantization (Q) and inverse quantization ($Q^{-1}$); entropy encoding (E); a reference frame memory (RFM); inter prediction ($P_{inter}$); intra prediction ($P_{intra}$); mode selection (MS) and filtering (F).

An example of a decoding process is illustrated in FIG. 3b. FIG. 3b illustrates a predicted representation of an image block (P′″); a reconstructed prediction error signal (D′″); a preliminary reconstructed image (I′″); a final reconstructed image (R′″); an inverse transform ($T^{-1}$); an inverse quantization ($Q^{-1}$); an entropy decoding ($E^{-1}$); a reference frame memory (RFM); a prediction (either inter or intra) (P); and filtering (F).

Figure 4A:
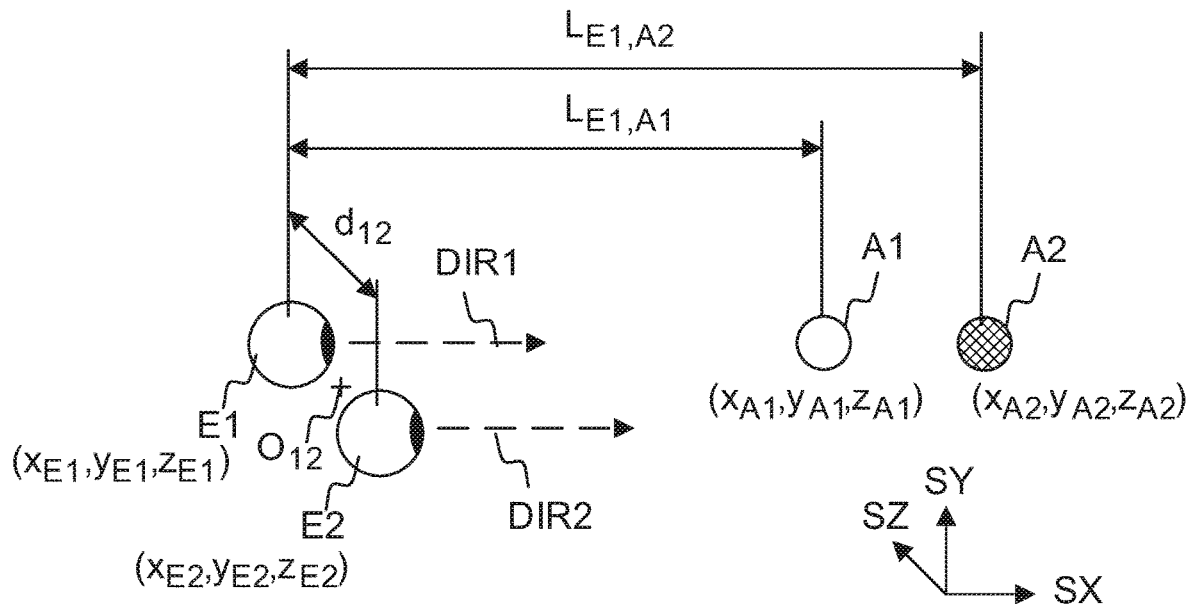
FIGS. 4a, 4b, 4c and 4d show a setup for forming a stereo image of a scene to a user.

FIGS. 4a, 4b, 4c and 4d show a setup for forming a stereo image of a scene to a user, for example a video frame of a 3D video. In FIG. 4a, a situation is shown where a human being is viewing two spheres A1 and A2 using both eyes E1 and E2. The sphere A1 is closer to the viewer than the sphere A2, the respective distances to the first eye E1 being $L_{E1,A1}$ and $L_{E1,A2}$. The different objects reside in space at their respective (x,y,z) coordinates, defined by the coordinate system SZ, SY and SZ. The distance $d_{12}$ between the eyes of a human being may be approximately 62-64 mm on average, and varying from person to person between 55 and 74 mm. This distance is referred to as the parallax, on which stereoscopic view of the human vision is based on. The viewing directions (optical axes) DIR1 and DIR2 are typically essentially parallel, possibly having a small deviation from being parallel, and define the field of view for the eyes. The head of the user has an orientation (head orientation) in relation to the surroundings, most easily defined by the common direction of the eyes when the eyes are looking straight ahead. That is, the head orientation tells the yaw, pitch and roll of the head in respect of a coordinate system of the scene where the user is.

When the viewer's body (thorax) is not moving, the viewer's head orientation is restricted by the normal anatomical ranges of movement of the cervical spine.

In the setup of FIG. 4a, the spheres A1 and A2 are in the field of view of both eyes. The centre-point $O_{12}$ between the eyes and the spheres are on the same line. That is, from the centre-point, the sphere A2 is behind the sphere A1. However, each eye sees part of sphere A2 from behind A1, because the spheres are not on the same line of view from either of the eyes.

Figure 4B:
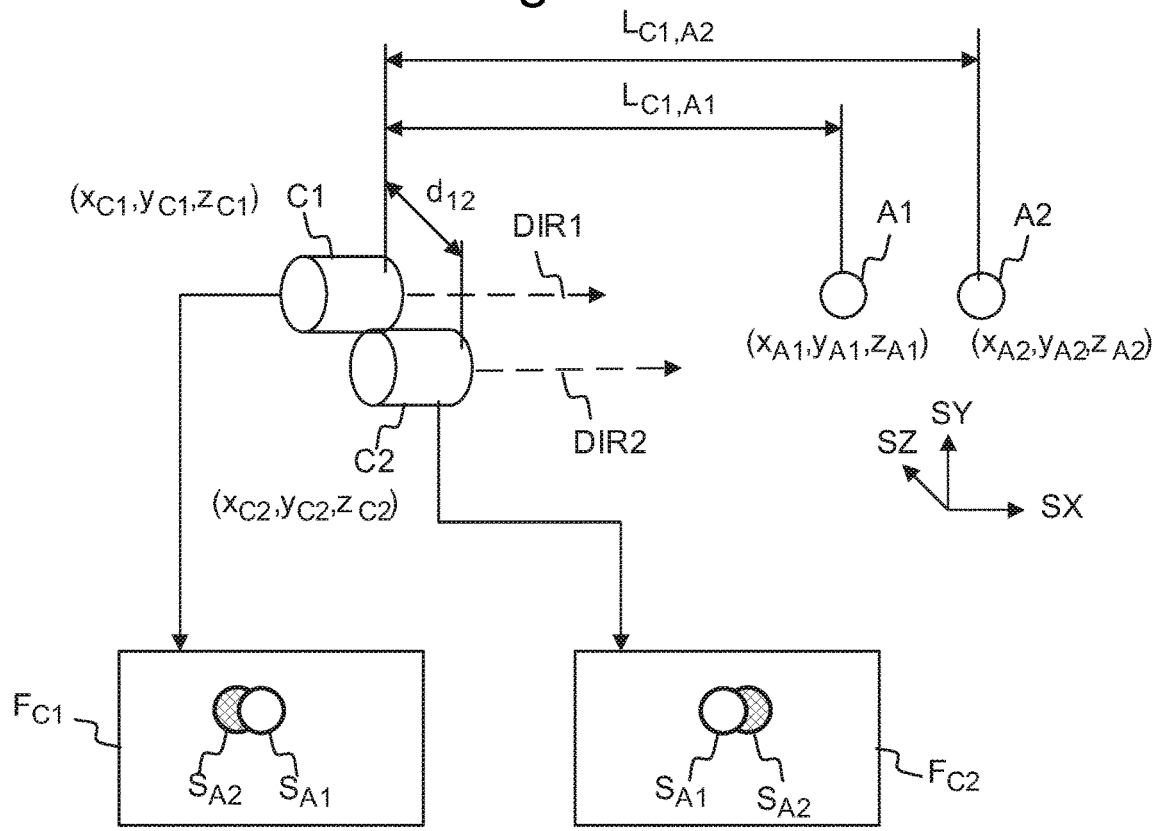

In FIG. 4b, there is a setup shown, where the eyes have been replaced by cameras C1 and C2, positioned at the location where the eyes were in FIG. 4a. The distances and directions of the setup are otherwise the same. Naturally, the purpose of the setup of FIG. 4b is to be able to take a stereo image of the spheres A1 and A2. The two images resulting from image capture are $F_{C1}$ and $F_{C2}$. The "left eye" image $F_{C1}$ shows the image $S_{A2}$ of the sphere A2 partly visible on the left side of the image $S_{A1}$ of the sphere A1. The "right eye" image $F_{C2}$ shows the image $S_{A2}$ of the sphere A2 partly visible on the right side of the image $S_{A1}$ of the sphere A1. This difference between the right and left images is called disparity, and this disparity, being the basic mechanism with which the HVS determines depth information and creates a 3D view of the scene, can be used to create an illusion of a 3D image.

In this setup of FIG. 4b, where the inter-eye distances correspond to those of the eyes in FIG. 4a, the camera pair C1 and C2 has a natural parallax, that is, it has the property of creating natural disparity in the two images of the cameras. Natural disparity may be understood to be created even though the distance between the two cameras forming the stereo camera pair is somewhat smaller or larger than the normal distance (parallax) between the human eyes, e.g. essentially between 40 mm and 100 mm or even 30 mm and 120 mm.

It needs to be understood here that the images $F_{C1}$ and $F_{C2}$ may be captured by cameras C1 and C2, where the cameras C1 and C2 may be real-world cameras or they may be virtual cameras. In the case of virtual cameras, the images $F_{C1}$ and $F_{C2}$ may be computed from a computer model of a scene by setting the direction, orientation and viewport of the cameras C1 and C2 appropriately such that a stereo image pair suitable for viewing by the human visual system (HVS) is created.

Figure 4C:
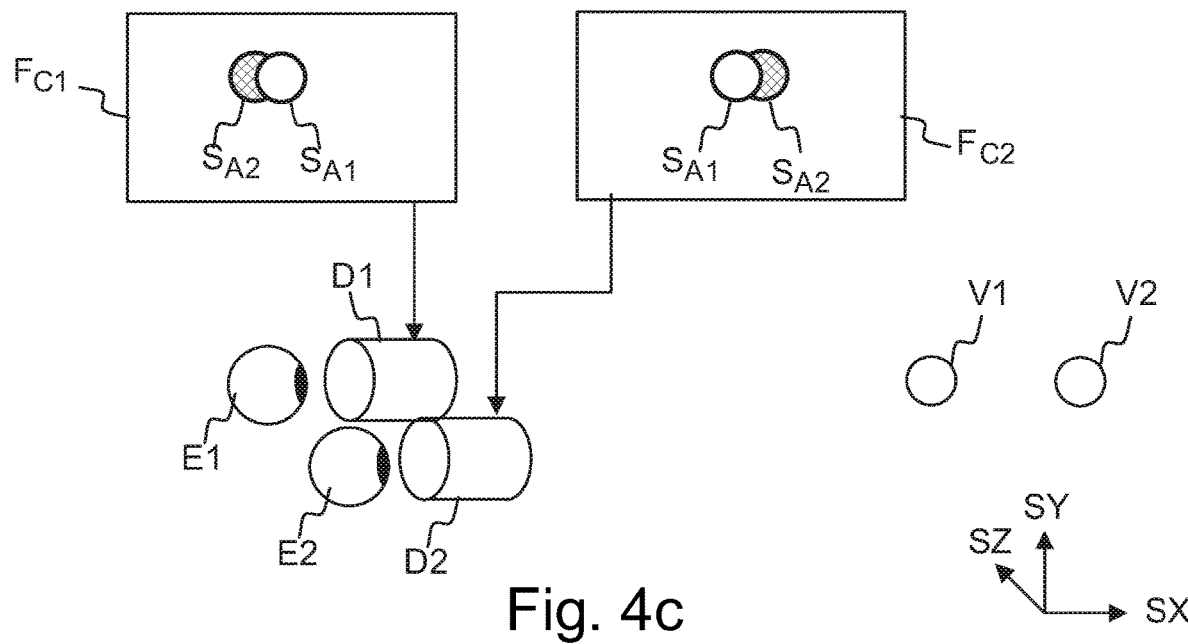

In FIG. 4c, the creating of this 3D illusion is shown. The images $F_{C1}$ and $F_{C2}$ captured or computed by the cameras C1 and C2 are displayed to the eyes E1 and E2, using displays D1 and D2, respectively. The disparity between the images is processed by the human visual system so that an understanding of depth is created. That is, when the left eye sees the image $S_{A2}$ of the sphere A2 on the left side of the image $S_{A1}$ of sphere A1, and respectively the right eye sees the image $S_{A2}$ of the sphere A2 on the right side, the human visual system creates an understanding that there is a sphere V2 behind the sphere V1 in a three-dimensional world. Here, it needs to be understood that the images $F_{C1}$ and $F_{C2}$ can also be synthetic, that is, created by a computer. If they carry the disparity information, synthetic images will also be seen as three-dimensional by the human visual system. That is, a pair of computer-generated images can be formed so that they can be used as a stereo image.

Figure 4D:
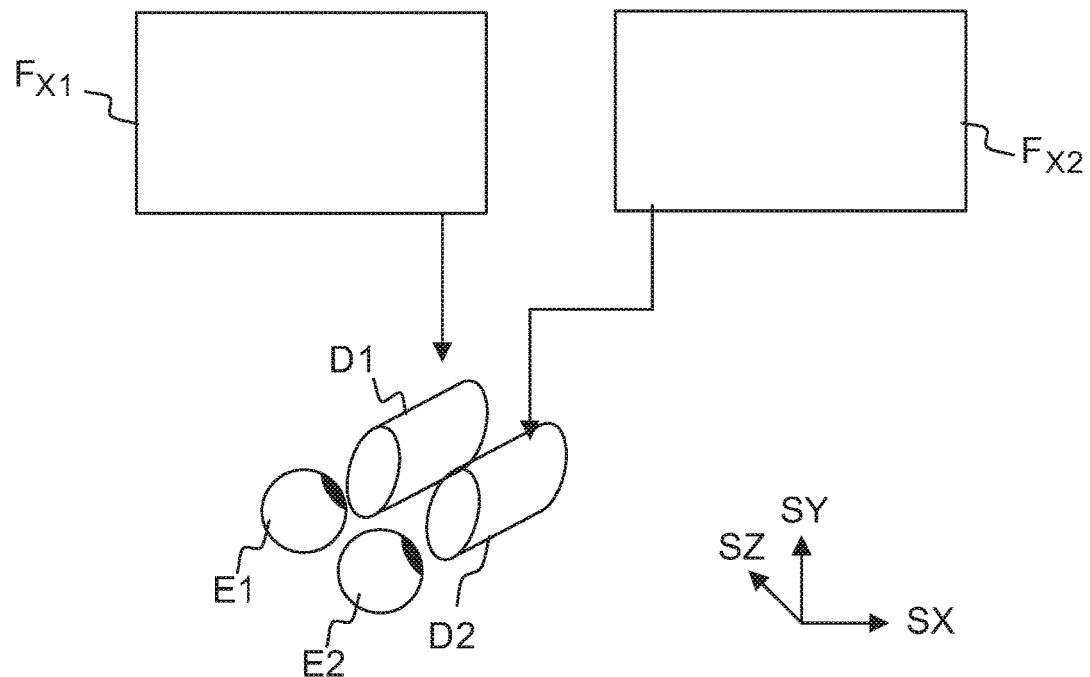

FIG. 4d illustrates how the principle of displaying stereo images to the eyes can be used to create 3D movies or virtual reality scenes having an illusion of being three-dimensional. The images $F_{X1}$ and $F_{X2}$ are either captured with a stereo camera or computed from a model so that the images have the appropriate disparity. By displaying a large number (e.g. 30) frames per second to both eyes using display D1 and D2 so that the images between the left and the right eye have disparity, the human visual system will create a cognition of a moving, three-dimensional image.

The field of view represented by the content may be greater than the displayed field of view e.g. in an arrangement depicted in FIG. 4d. Consequently, only a part of the content along the direction of view (a.k.a. viewing orientation) is displayed at a single time. This direction of view, that is, the head orientation, may be determined as a real orientation of the head e.g. by an orientation detector mounted on the head, or as a virtual orientation determined by a control device such as a joystick or mouse that can be used to manipulate the direction of view without the user actually moving his head. That is, the term "head orientation" may be used to refer to the actual, physical orientation of the user's head and changes in the same, or it may be used to refer to the virtual direction of the user's view that is determined by a computer program or a computer input device.

The content may enable viewing from several viewing positions within the 3D space. The texture picture(s), the geometry picture(s) and the geometry information may be used to synthesize the images $F_{X1}$ and/or $F_{X2}$ as if the displayed content was captured by camera(s) located at the viewing position.

The principle illustrated in FIGS. 4a-4d may be used to create three-dimensional images to a viewer from a three-dimensional scene model (volumetric video) after the scene model has been encoded at the sender and decoded and reconstructed at the receiver. Because volumetric video describes a 3D scene or object at different (successive) time instances, such data can be viewed from any viewpoint. Therefore, volumetric video is an important format for any augmented reality, virtual reality and mixed reality applications, especially for providing viewing capabilities having six degrees of freedom (so-called 6DOF viewing).

Figure 5:
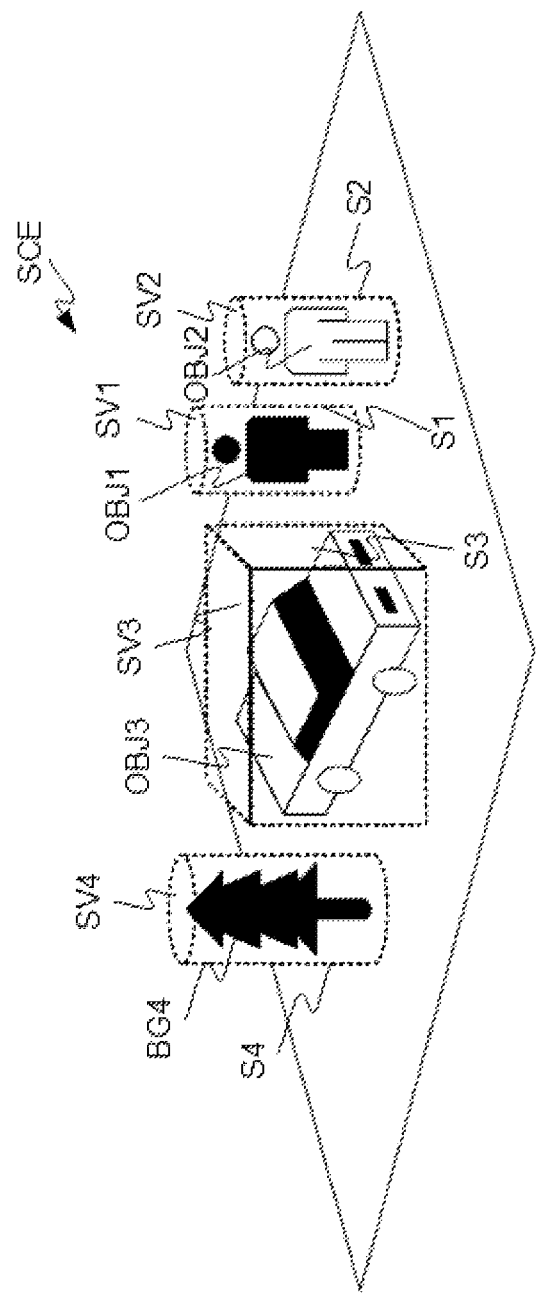
FIG. 5 illustrates projection of source volumes in a scene and parts of an object to projection surfaces, as well as determining depth information.

FIG. 5 illustrates projection of source volumes in a digital scene model SCE and parts of an object model OBJ1, OBJ2, OBJ3, BG4 to projection surfaces S1, S2, S3, S4, as well as determining depth information for the purpose of encoding volumetric video.

The projection of source volumes SV1, SV2, SV3, SV4 may result in texture pictures and geometry pictures, and there may be geometry information related to the projection source volumes and/or projection surfaces. Texture pictures, geometry pictures and projection geometry information may be encoded into a bitstream. A texture picture may comprise information on the colour data of the source of the projection. Through the projection, such colour data may result in pixel colour information in the texture picture. Pixels may be coded in groups, e.g. coding units of rectangular shape. The projection geometry information may comprise but is not limited to one or more of the following:

projection type, such as planar projection or equirectangular projection
projection surface type, such as a cube
location of the projection surface in 3D space
orientation of the projection surface in 3D space
size of the projection surface in 3D space
type of a projection centre, such as a projection centre point, axis, or plane
location and/or orientation of a projection centre.

The projection may take place by projecting the geometry primitives (points of a point could, triangles of a triangle mesh or voxels of a voxel array) of a source volume SV1, SV2, SV3, SV4 (or an object OBJ1, OBJ2, OBJ3, BG4) onto a projection surface S1, S2, S3, S4. The geometry primitives may comprise information on the texture, for example a colour value or values of a point, a triangle or a voxel. The projection surface may surround the source volume at least partially such that projection of the geometry primitives happens from the centre of the projection surface outwards to the surface. For example, a cylindrical surface has a centre axis and a spherical surface has a centre point. A cubical or rectangular surface may have centre planes or a centre axis and the projection of the geometry primitives may take place either orthogonally to the sides of the surface or from the centre axis outwards to the surface. The projection surfaces, e.g. cylindrical and rectangular, may be open from the top and the bottom such that when the surface is cut and rolled out on a two-dimensional plane, it forms a rectangular shape. In general, projection surfaces need not be rectangular but may be arranged or located spatially on a rectangular picture. Such rectangular shape with pixel data can be encoded and decoded with a video codec.

Alternatively, or additionally, the projection surface such as a planar surface or a sphere may be inside a group of geometry primitives, e.g. inside a point cloud that defines a surface. In the case of an inside projection surface, the projection may take place from outside in towards the centre and may result in sub-sampling of the texture data of the source.

In a point cloud based scene model or object model, points may be represented with any floating point coordinates. A quantized point cloud may be used to reduce the amount of data, whereby the coordinate values of the point cloud are represented e.g. with 10-bit, 12-bit or 16-bit integers. Integers may be used because hardware accelerators may be able to operate on integers more efficiently. The points in the point cloud may have associated colour, reflectance, opacity etc. texture values. The points in the point cloud may also have a size, or a size may be the same for all points. The size of the points may be understood as indicating how large an object the point appears to be in the model in the projection. The point cloud is projected by ray casting from the projection surface to find out the pixel values of the projection surface. In such a manner, the topmost point remains visible in the projection, while points closer to the centre of the projection surface may be occluded. In other words, in general, the original point cloud, meshes, voxels, or any other model is projected outwards to a simple geometrical shape, this simple geometrical shape being the projection surface.

Different projection surfaces may have different characteristics in terms of projection and reconstruction. In the sense of computational complexity, a projection to a cubical surface may be the most efficient, and a cylindrical projection surface may provide accurate results efficiently. Also cones, polyhedron-based parallelepipeds (hexagonal or octagonal, for example) and spheres or a simple plane may be used as projection surfaces.

The phrase along with the bitstream (e.g. indicating along with the bitstream) may be defined to refer to out-of-band transmission, signalling, or storage in a manner that the out-of-band data is associated with the bitstream. The phrase decoding along with the bitstream or alike may refer to decoding the referred out-of-band data (which may be obtained from out-of-band transmission, signalling, or storage) that is associated with the bitstream. For example, an indication along with the bitstream may refer to metadata in a container file that encapsulates the bitstream.

Figure 6A:
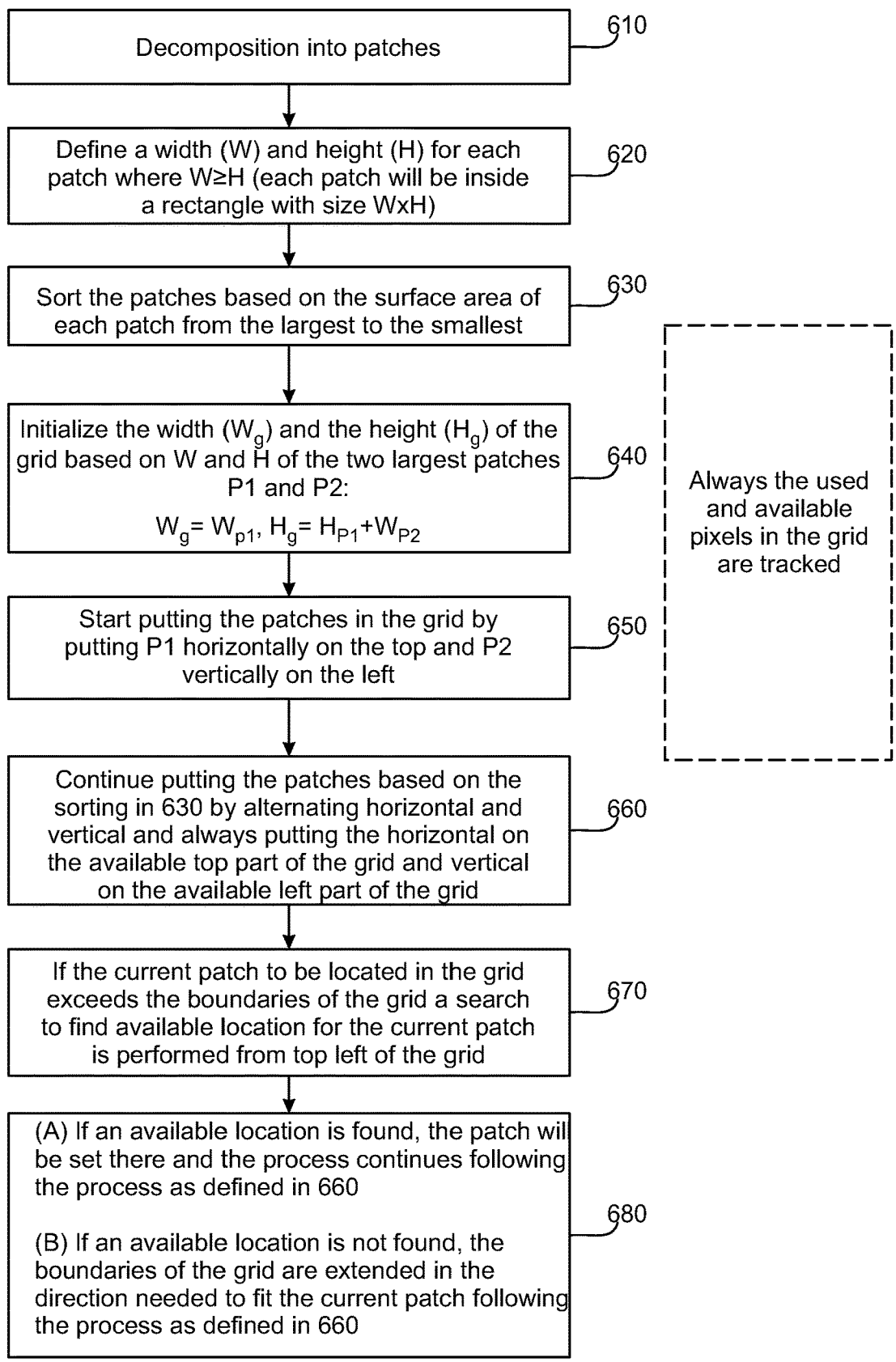
FIGS. 6a and 6b show flow charts for compressing, encoding and decoding of a scene of a volumetric video.
Figure 7A:
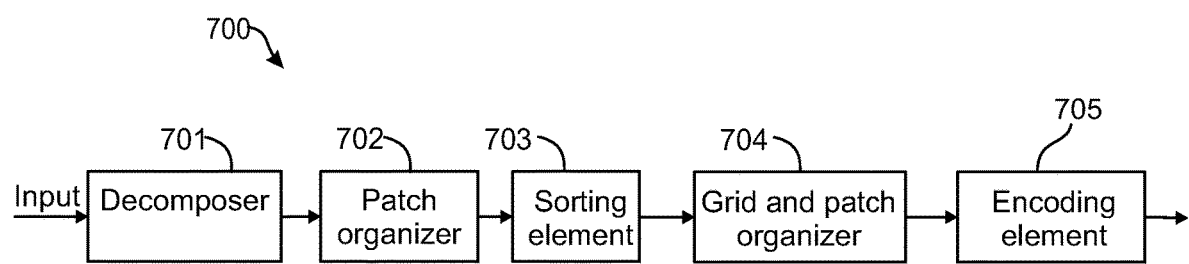
FIG. 7a illustrates an example of an encoding element.

In the following an example method is described with reference to the block diagram of an encoder 700 in FIG. 7a, a flow diagram depicted in FIG. 6a, and examples of grids in FIGS. 8a-8f. In the following, a grid is always referring to a two-dimensional grid on which the patches are located.

In step 610, three-dimensional content is obtained and decomposed to several patches by a decomposer 701.

In step 620 a patch organizer 702 examines each patch and tries to find a smallest rectangle that could fully cover the current patch. In other words, the patch organizer may try to surround each patch with a rectangle so that the area of the rectangle is the smallest possible. When such a rectangle has been found, a width (W) and a height (H) are defined for the current patch on the basis of the width and height of the found rectangle i.e. the width and height of the rectangle represent the width and height of the current patch. The patch organizer 702 may create a list of the rectangles wherein the list may comprise information of the width and height and/or the surface area of the rectangles and identification information of the patch for which the rectangle has been formed.

It should be noted that since an object of the method is to find the smallest rectangle that covers the current patch, then the patch is not necessarily located vertically or horizontally inside the rectangle. Therefore, in the side information of each rectangle, also data related to the orientation of the patch may be transmitted, e.g. the rotation angle compared to the projected content on the patch. This may increase the efficiency of putting the patches in the 2D grid while an overhead information per patch is to be transmitted. In an alternative embodiment, the orientation of the projected patches is not changed. This embodiment does not require any overhead to be transmitted per patch.

In step 630 a sorting element 703 of the encoder 700 sorts the patches on the basis of the surface areas of the rectangles. The sorting is performed from the largest surface area (W×H) to the smallest surface area. This may be performed, for example, so that the sorting element goes through the list of rectangles and forms indices for the rectangles so that a first index (e.g. 0 or 1) indicates the largest rectangle and a last index (e.g. the first index+the number of rectangles−1) indicates the smallest rectangle.

In accordance with another embodiment, no indices are used but the sorting element 703 may rearrange the patches in the list from the largest to the smallest. In other words, the patch in the beginning of the list has a rectangle with the largest area to cover it and the patch in the end of the list has a rectangle with the smallest area to cover it.

In this embodiment, the width is always considered to be larger than or equal to the height i.e. W≥H. This will ease the process of locating the patches and describing of different steps of the invention. However, the invention is not limited to that embodiment, but it may also be possible to consider that the height is larger than or equal to the width i.e. H≥W.

In a general case, this does not matter as for each patch the width and height can be compared and a decision can be made on which one is larger.

In yet another embodiment, the patches are sorted based on the size of maximum of height and width for all patches. It means that the longest width or height in all patches is ranked first and following that, the second largest width or height is in the list.

In another embodiment, the patches are sorted based on the size of height for all patches.

In still another embodiment, the patches are sorted based on the size of width for all patches.

In still another embodiment, the rectangles are sorted based on the surface area of the patch. This means, the patch which is projected from a 3D object in the scene, as compared to the rectangle size which has covered it. In this embodiment, the sorting ensures that the largest valid projection data (each patch) is ranked first. It should be noted that this embodiment may or may not result in a ranking similar to the sorting of patches based on the surface area of the covering rectangles.

In step 640 a preliminary size of the grid is defined e.g. by a grid and patch organizer 704. The width (Wg) and height (Hg) of the grid is defined based on the width and height of the largest patch P1 and the second largest patch P2.

The width of the first patch P1 (WP1), width≥height as clarified in Step 630, is to be set as the width Wg of the grid. The height of the grid, Hg, is defined as the sum of the height of the first patch P1, HP1 and the width of the second patch P2 i.e. WP2. So, the following equations are proposed here:

$$Wg=Wp1$$

$$Hg=HP1+Wp2$$

Figure 8A:
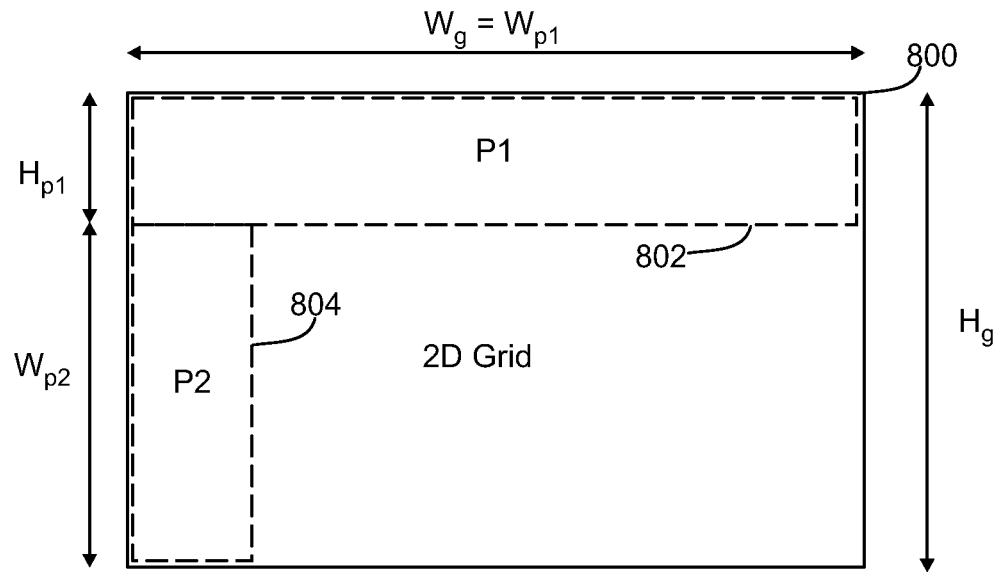
FIGS. 8a-8f illustrate examples of forming a grid for patches and arranging the patches in the grid, in accordance with an embodiment.

FIG. 8a shows an example how the step 640 may be implemented. The largest rectangle 800 refers to the grid while the first dashed rectangle 802 refers to the largest patch P1 and the second dashed rectangle 804 refers to the second largest patch P2.

In another embodiment, the preliminary Wg and Hg are defined based on any other combination of height and width of the patch P1 and patch P2.

In another embodiment, the preliminary size of the grid may be increased to make the width and height of it an even number.

In another embodiment, the preliminary size of the grid may be increased to make the width and height of it a power of two.

In another embodiment, the preliminary Wg and Hg are defined based on any combination of height and width of the first N patch in the sorted patch list i.e. P1, P2, . . . , PN.

In step 650 the first (largest) patch P1 and the second (second largest) patch P2 are located in the top and left of the grid as depicted in FIG. 8a. It should be noted that since W≥H in all patches, then the wording horizontally and vertically becomes meaningful. So, the first patch P1 is located horizontally and the second patch P2, is set vertically.

It should be noted that from this step onwards, the algorithm may always keep track of used pixels and available pixels in the grid. This information will be required in the next steps of the proposed idea. The used pixels refer to the pixels which are actually occupied with the patches, not the whole rectangle. This is due to the fact that each patch is not normally of the exact size of the rectangle, but only covers a part of the rectangle, as the patches do not necessarily have rectangular shapes. The available and used pixels' map will be used in the following steps.

In step 660 the patches are put in the remaining parts of the grid with a similar approach as in step 650. It means that the next largest patch in the sorted list (as defined in step 630), P3, is put horizontally below P1 and the next largest patch P4 is put vertically below P3 and in the extreme available left side i.e. the right-hand side of P2.

Figure 8B:
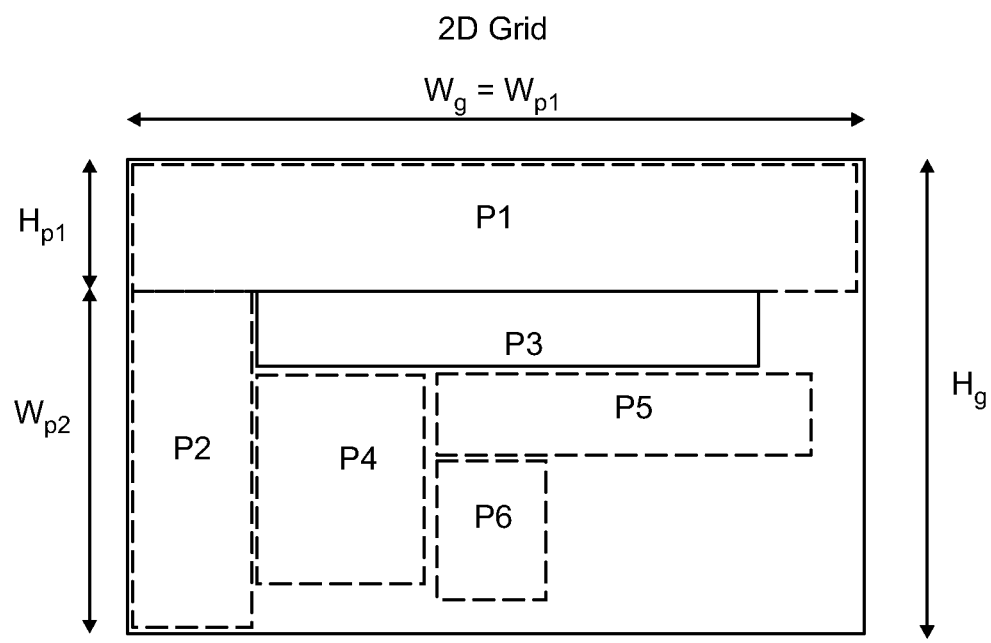

Step 660 is further clarified in FIG. 8b where six largest patches are located in the grid. Similar approach can be considered for the rest of the patches in the sorted list of step 630.

One example embodiment of step 660 has been defined above. Some other alternative embodiments are defined in the following:

In another embodiment, after putting the first patch and the second patch and defining the size of the grid, the patches may be located vertically or horizontally according to the available space in the grid and the preference of the encoder 700.

In another embodiment, after putting the first patch and the second patch and defining the size of the grid, the patches may all be located vertically in the available spaces of the grid from top left available space to the right.

In another embodiment, after putting the first patch and the second patch and defining the size of the grid, the patches may all be located horizontally in the available spaces of the grid from top left available space to the bottom.

In another embodiment, after putting the first patch and the second patch and defining the size of the grid, the sorting of patches 703 may be done again using another sorting embodiment, and following that the patches may be located in the grid according to any of the previous embodiments. For example, the remaining patches may all be located vertically in the available spaces of the grid from top left available space to the right, or they may be located horizontally from the top right to the bottom of the available space, or a part of the remaining patches may be located vertically in the available spaces of the grid from top left available space to the right, and the other part of the remaining patches may be located horizontally from the top right to the bottom of the available space, etc.

In another embodiment, the sorting embodiment may change at any point of the process. It means that after putting the first N (N is an arbitrary number between 2 and Max number of patches) patch with one sorting embodiment, another sorting embodiment is used for a set of M patches, and then the sorting embodiment may vary to yet another sorting embodiment. Several sorting embodiments may be used during this process in arbitrary phases of the patch organizing process.

In step 670 some exceptions, if any, will be processed. One such exception occurs when the size of the current patch to be located in the grid would exceed the boundaries of the grid. This step is aligned with the locating method that is defined in step 660. In this case, the algorithm will search from top-left to the bottom-right to find an available location in the grid to put the patch. In one embodiment the search in this step is based on the actual size of the patch and not the rectangle that is surrounding it. In another embodiment, the search is performed based on the size of rectangle covering the patch. The potential options on availability and not availability of location for the current patch to be located in the grid are dealt with in step 680, which is explained next.

In step 680 two possible outcomes are possible which are further described/clarified in the following:

In the first outcome the search in the grid has been successful and an available location is found in the grid where the current patch can be located. Hence, the patch is located in the found available location and the next patch is dealt with according to the process as defined in 660.

Figure 8C:
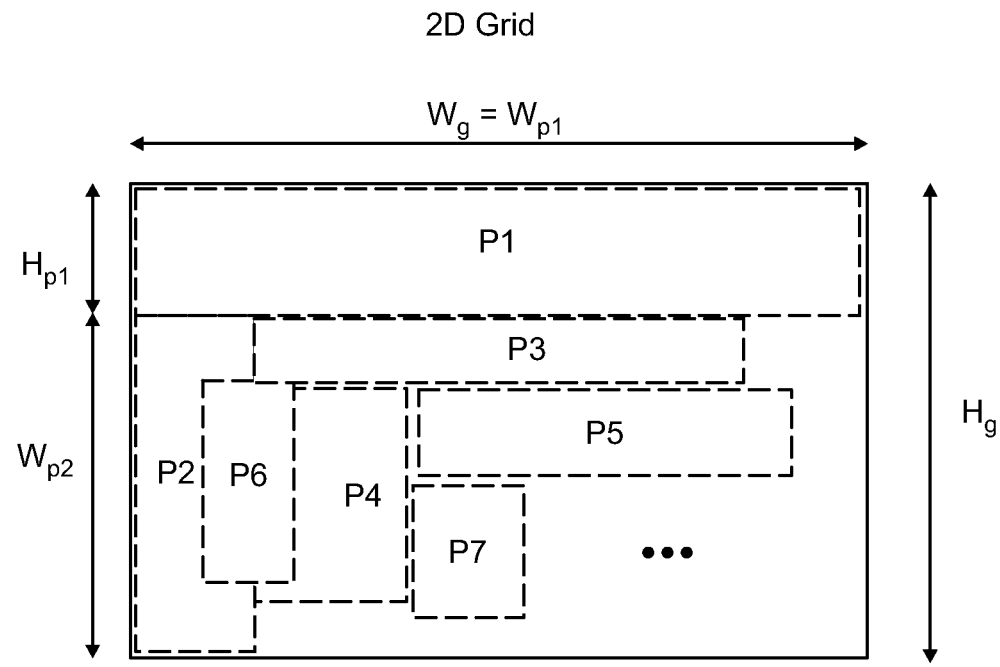

FIG. 8c illustrates how the step 680 may be performed in the first outcome. In this figure, a sixth patch P6 exceeded the boundaries of the grid and hence, a search has been performed to locate it in the grid. In this example, a location between the second patch P2, the third patch P3 and the fourth patch P4 has been found in which the actual patches are not covering an area which is needed by the sixth patch in P6. Therefore, the sixth patch P6 is located there and seventh patch P7 replaces the sixth patch P6 in the process as defined in the step 660.

In the second outcome the search in the grid has not been successful, wherein an available location has not been found. In this case, the current patch is exceeding the boundaries of the grid and the search in the grid to locate it has failed to find an available location to put it. Therefore, the patch is located according to the process in step 660 and the boundaries of the grid is extended in order to fit the current patch.

Figure 8D:
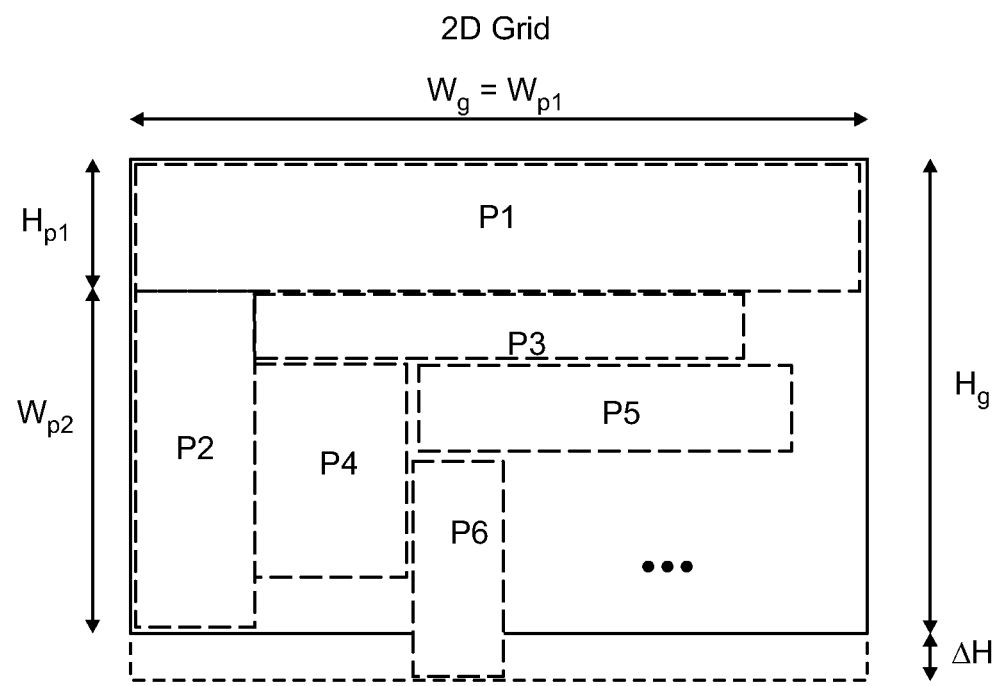

This process is illustrated in FIG. 8d. In this figure, the search for locating the sixth patch P6 has not been successful for finding a location for it and hence, the height of the grid has been extended in order to fit the sixth patch P6 too. The extension is illustrated with a dotted line and marked with $\Delta H$ in FIG. 8d. The extension is illustrated with a dotted line and marked with $\Delta H$ in FIG. 8d. Following this, the process will follow the same process as described in step 660.

In another embodiment, the width of the grid may be extended in order to fit any patch e.g. the sixth patch P6.

In another embodiment, both the width and the height of the grid may be extended in order to fit any patch e.g. the sixth patch P6.

The grid and the patches may be encoded by the encoding element 705 for transmission to a decoder and/or storage.

In the following, some other alternative embodiments will be shortly described.

In an embodiment, when trying to extend the size of the grid, a location is found where the least amount of extension in the grid's area is required. This means that, for example, if a pixel extension $\alpha$ in a horizontal direction (Wg=Wg+$\alpha$, in pixels) increases the area of the grid less than a pixel extension $\beta$ in vertical direction (Hg=Hg+$\beta$) then, the extension in horizontal direction is selected even though $\alpha > \beta$. In other words:

New area1=$(Wg+\alpha) \times Hg$

New area2=$Wg \times (Hg+\beta)$

The selected extension should minimize the new area regardless of the values of $\alpha$ and $\beta$ and order by which the patch was expected to be put in the grid.

Figure 8E:
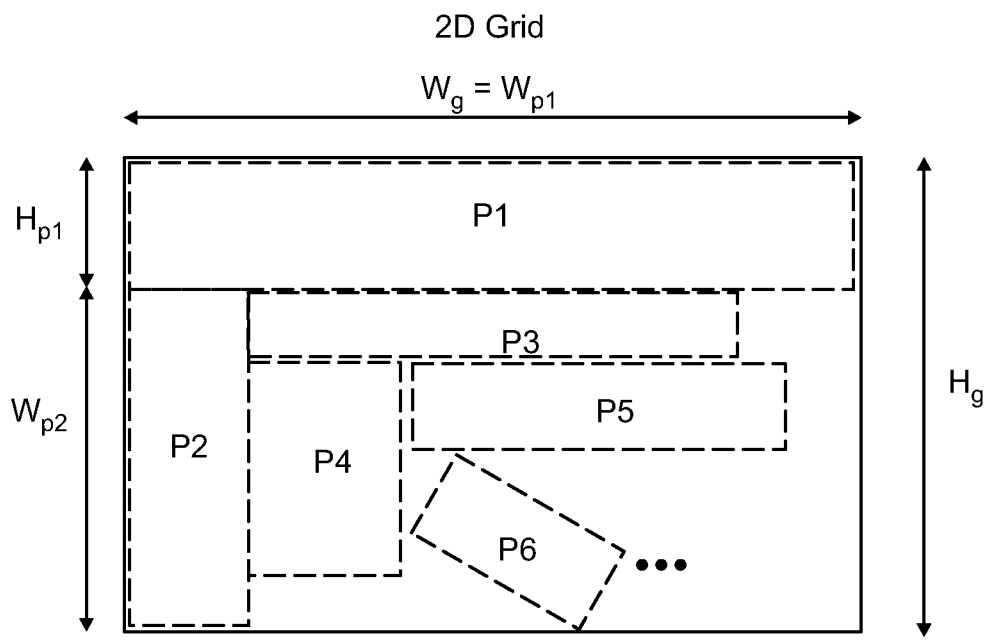

In another embodiment, when trying to extend the size of the grid, a diagonal locating of the patch with an arbitrary angle may be considered to prevent the extension of the grid or minimize it. FIG. 8e illustrates an example in which one patch P6 is inserted diagonally to the grid.

Figure 8F:
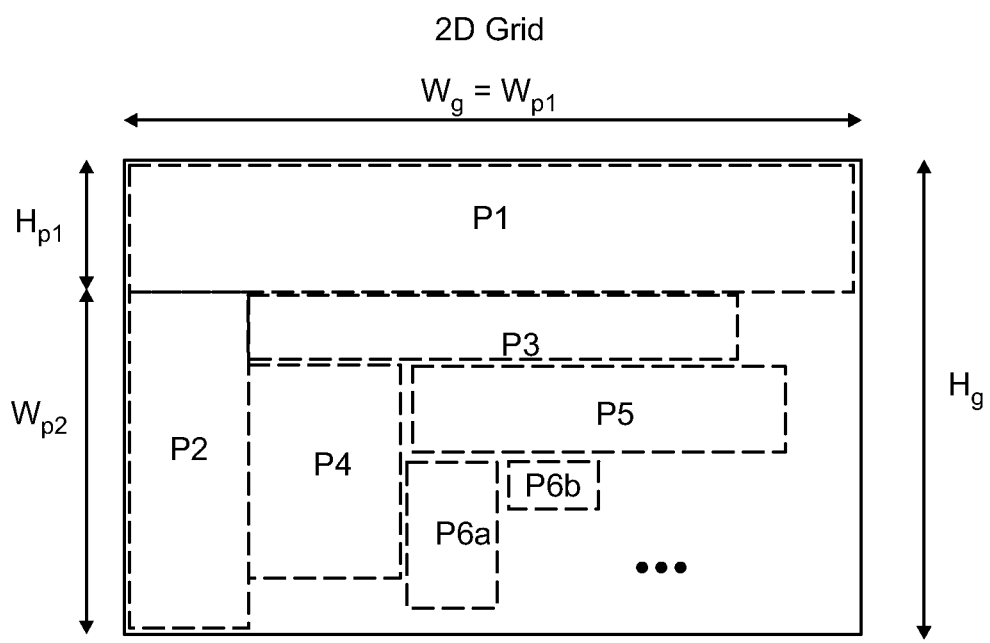

In another embodiment, when trying to extend the size of the grid, an encoder could decide to subdivide the current patch into smaller patches instead, which could fit in the available 2D grid space without extending the 2D grid. FIG. 8f illustrates an example in which one patch P6 is divided into two subpatches P6a and P6b and these subpatches P6a, P6b are inserted to free locations of the grid.

In another embodiment, when trying to extend the size of the grid, an encoder could decide to change the location of a previous patch in the grid in order to minimize or remove extending of the 2D grid.

In general, the invention is not limited to putting the patches only vertically or horizontally in a rectangle. It may also include putting the patches in any arbitrary direction with a defined angle and also other forms for the grids than rectangles could be used. Furthermore, patches are not necessarily located vertically or horizontally inside the grid.

The process of locating the patches on different parts of a grid is performed in the encoder side. However, the grid size should be communicated with the decoder size.

The horizontal/vertical locating of the patches and also the angle or arbitrary direction putting of patches may be signalled enabling a decoder to accurately fetching the patches with correct presentation/direction. The information regarding each patch should also be communicated with the decoder and signalled that e.g. the current patch has a specific direction/orientation which can be fetched in the decoder side. Such signalling may include the shape, size, location, and orientation/direction of the patch in the 2D grid.

In another embodiment, the grid does not necessarily have a rectangular shape but may have a different shape e.g. diamond or Parallelogram. Then, the size of the grid may be determined so that its size is as small as possible but still being able to cover the patches. The gist of the algorithm remains the same for all different shapes but the locating and sizing may change.

Figure 6B:
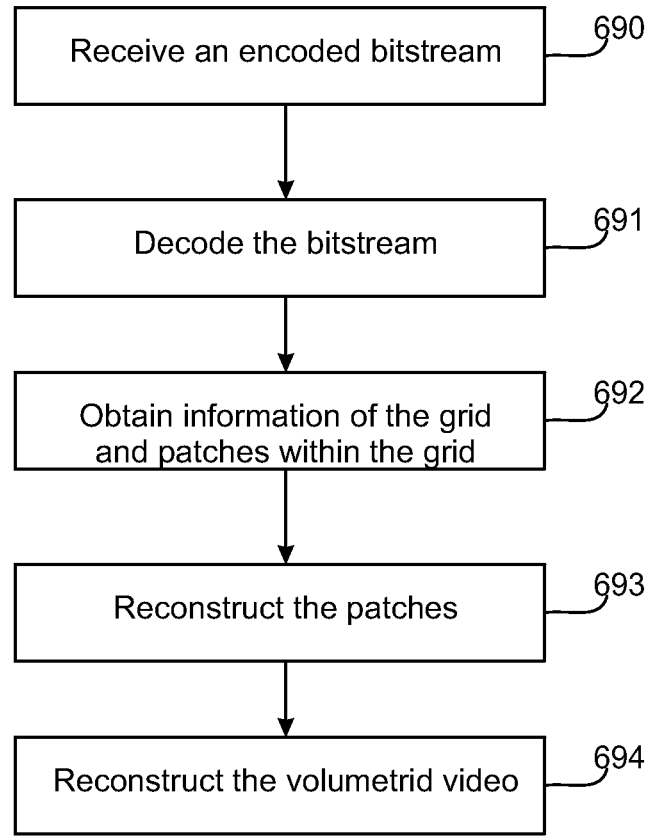
Figure 7B:
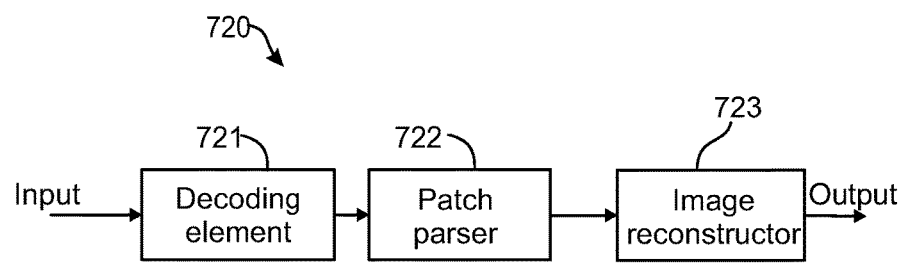
FIG. 7b illustrates an example of a decoding element.

In the following, the operation at a decoder side is explained in more detail with reference to the flow diagram of FIG. 6b and the block diagram of FIG. 7b. A decoder 720 receives 690 a bitstream and a decoding element 721 decodes 691 the bitstream to reconstruct the encoded information from the bitstream. The decoded information may comprise information of the geographical shape of the grid, unless a predetermined shape is used, the size (e.g. the width and height) of the grid, and information of the patches and their location within the grid. A patch parser 722 uses 692 this information to reconstruct 693 the patches from the grids. Reconstructed patches may then be converted 694 to point clouds and further to volumetric video by an image reconstructor 723.

A picture may be defined to be either a frame or a field. A frame may be defined to comprise a matrix of luma samples and possibly the corresponding chroma samples. A field may be defined to be a set of alternate sample rows of a frame. Fields may be used as encoder input for example when the source signal is interlaced. Chroma sample arrays may be absent (and hence monochrome sampling may be in use) or may be subsampled when compared to luma sample arrays. Some chroma formats may be summarized as follows:
- In monochrome sampling there is only one sample array, which may be nominally considered the luma array.
- In 4:2:0 sampling, each of the two chroma arrays has half the height and half the width of the luma array.
- In 4:2:2 sampling, each of the two chroma arrays has the same height and half the width of the luma array.
- In 4:4:4 sampling when no separate colour planes are in use, each of the two chroma arrays has the same height and width as the luma array.

In H.264/AVC and HEVC, it is possible to code sample arrays as separate colour planes into the bitstream and respectively decode separately coded colour planes from the bitstream. When separate colour planes are in use, each one of them is separately processed (by the encoder and/or the decoder) as a picture with monochrome sampling.

A partitioning may be defined as a division of a set into subsets such that each element of the set is in exactly one of the subsets.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples. A CU with the maximum allowed size may be named as LCU (largest coding unit) or coding tree unit (CTU) and the video picture is divided into non-overlapping LCUs.

A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

A motion-constrained tile set (MCTS) is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set. Additionally, the encoding of an MCTS is constrained in a manner that motion vector candidates are not derived from blocks outside the MCTS. This may be enforced by turning off temporal motion vector prediction of HEVC, or by disallowing the encoder to use the TMVP candidate or any motion vector prediction candidate following the TMVP candidate in the merge or AMVP candidate list for PUs located directly left of the right tile boundary of the MCTS except the last one at the bottom right of the MCTS. In general, an MCTS may be defined to be a tile set that is independent of any sample values and coded data, such as motion vectors, that are outside the MCTS. In some cases, an MCTS may be required to form a rectangular area. It should be understood that depending on the context, an MCTS may refer to the tile set within a picture or to the respective tile set in a sequence of pictures. The respective tile set may be, but in general need not be, collocated in the sequence of pictures.

It is noted that sample locations used in inter prediction may be saturated by the encoding and/or decoding process so that a location that would be outside the picture otherwise is saturated to point to the corresponding boundary sample of the picture. Hence, if a tile boundary is also a picture boundary, in some use cases, encoders may allow motion vectors to effectively cross that boundary or a motion vector to effectively cause fractional sample interpolation that would refer to a location outside that boundary, since the sample locations are saturated onto the boundary. In other use cases, specifically if a coded tile may be extracted from a bitstream where it is located on a position adjacent to a picture boundary to another bitstream where the tile is located on a position that is not adjacent to a picture boundary, encoders may constrain the motion vectors on picture boundaries similarly to any MCTS boundaries.

The temporal motion-constrained tile sets SEI message of HEVC can be used to indicate the presence of motion-constrained tile sets in the bitstream.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF). H.264/AVC includes a deblocking, whereas HEVC includes both deblocking and SAO.

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired coding mode for a block and associated motion vectors. This kind of cost function uses a weighting factor $\lambda$ to tie together the (exact or estimated) image distortion due to lossy coding methods and the (exact or estimated) amount of information that is required to represent the pixel values in an image area:

$$C = D + \lambda R, \qquad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring CU may be regarded as unavailable for intra prediction, if the neighboring CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. The abbreviation TID may be used to interchangeably with the TemporalId variable. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to tid_value does not use any picture having a TemporalId greater than tid_value as inter prediction reference.

NAL units can be categorized into Video Coding Layer (VCL) NAL units and non-VCL NAL units. VCL NAL units are typically coded slice NAL units. In HEVC, VCL NAL units contain syntax elements representing one or more CU.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

Out-of-band transmission, signaling or storage can additionally or alternatively be used for other purposes than tolerance against transmission errors, such as ease of access or session negotiation. For example, a sample entry of a track in a file conforming to the ISO Base Media File Format may comprise parameter sets, while the coded data in the bitstream is stored elsewhere in the file or in another file. The phrase along the bitstream (e.g. indicating along the bitstream) or along a coded unit of a bitstream (e.g. indicating along a coded tile) may be used in claims and described embodiments to refer to out-of-band transmission, signaling, or storage in a manner that the out-of-band data is associated with the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

In HEVC, there are two types of SEI NAL units, namely the suffix SEI NAL unit and the prefix SEI NAL unit, having a different nal_unit_type value from each other. The SEI message(s) contained in a suffix SEI NAL unit are associated with the VCL NAL unit preceding, in decoding order, the suffix SEI NAL unit. The SEI message(s) contained in a prefix SEI NAL unit are associated with the VCL NAL unit following, in decoding order, the prefix SEI NAL unit.

A coded picture is a coded representation of a picture.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units. Said specified classification rule may for example associate pictures with the same output time or picture output count value into the same access unit.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

In H.264/AVC, a coded video sequence is defined to be a sequence of consecutive access units in decoding order from an IDR access unit, inclusive, to the next IDR access unit, exclusive, or to the end of the bitstream, whichever appears earlier.

In HEVC, a coded video sequence (CVS) may be defined, for example, as a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. An IRAP access unit may be defined as an access unit in which the base layer picture is an IRAP picture. The value of NoRaslOutputFlag is equal to 1 for each IDR picture, each BLA picture, and each IRAP picture that is the first picture in that particular layer in the bitstream in decoding order, is the first IRAP picture that follows an end of sequence NAL unit having the same value of nuh_layer_id in decoding order. There may be means to provide the value of HandleCraAsBlaFlag to the decoder from an external entity, such as a player or a receiver, which may control the decoder. HandleCraAsBlaFlag may be set to 1 for example by a player that seeks to a new position in a bitstream or tunes into a broadcast and starts decoding and then starts decoding from a CRA picture. When HandleCraAsBlaFlag is equal to 1 for a CRA picture, the CRA picture is handled and decoded as if it were a BLA picture.

In HEVC, a coded video sequence may additionally or alternatively (to the specification above) be specified to end, when a specific NAL unit, which may be referred to as an end of sequence (EOS) NAL unit, appears in the bitstream and has nuh_layer_id equal to 0.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An HEVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may start from an IDR picture. In HEVC a closed GOP may also start from a BLA_W_RADL or a BLA_N_LP picture. An open GOP coding structure is potentially more efficient in the compression compared to a closed GOP coding structure, due to a larger flexibility in selection of reference pictures.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

Several candidate motion vectors may be derived for a single prediction unit. For example, motion vector prediction HEVC includes two motion vector prediction schemes, namely the advanced motion vector prediction (AMVP) and the merge mode. In the AMVP or the merge mode, a list of motion vector candidates is derived for a PU. There are two kinds of candidates: spatial candidates and temporal candidates, where temporal candidates may also be referred to as TMVP candidates.

A candidate list derivation may be performed for example as follows, while it should be understood that other possibilities may exist for candidate list derivation. If the occupancy of the candidate list is not at maximum, the spatial candidates are included in the candidate list first if they are available and not already exist in the candidate list. After that, if occupancy of the candidate list is not yet at maximum, a temporal candidate is included in the candidate list. If the number of candidates still does not reach the maximum allowed number, the combined bi-predictive candidates (for B slices) and a zero motion vector are added in. After the candidate list has been constructed, the encoder decides the final motion information from candidates for example based on a rate-distortion optimization (RDO) decision and encodes the index of the selected candidate into the bitstream. Likewise, the decoder decodes the index of the selected candidate from the bitstream, constructs the candidate list, and uses the decoded index to select a motion vector predictor from the candidate list.

In HEVC, AMVP and the merge mode may be characterized as follows. In AMVP, the encoder indicates whether uni-prediction or bi-prediction is used and which reference pictures are used as well as encodes a motion vector difference. In the merge mode, only the chosen candidate from the candidate list is encoded into the bitstream indicating the current prediction unit has the same motion information as that of the indicated predictor. Thus, the merge mode creates regions composed of neighbouring prediction blocks sharing identical motion information, which is only signalled once for each region.

Texture picture(s) and the respective geometry picture(s) may have the same or different chroma format.

Depending on the context, a pixel may be defined to a be a sample of one of the sample arrays of the picture or may be defined to comprise the collocated samples of all the sample arrays of the picture.

Projecting 3D data onto 2D planes is independent from the 3D scene model representation format. There exist several approaches for projecting 3D data onto 2D planes, with the respective signalling. For example, there exist several mappings from spherical coordinates to planar coordinates, known from map projections of the globe, and the type and parameters of such projection may be signalled. For cylindrical projections, the aspect ratio of height and width may be signalled.

In the following, the operation of a decoder is explained in more detail.

In an embodiment, the decoder receives the coded bitstream of the volumetric video (or a part of it) and decodes the information carried by the bitstream or a part of it. The decoder decodes the depth picture. The decoder may then examine depth values of a block and compare them to the default value, for example to 0, a maximum depth value, or a minimum depth value. If the comparison reveals that the depth value of the current pixel is equal to the default value or deviates from the default value less than a threshold, the decoder may conclude that the depth pixel is non-valid. If all the depth pixels of a depth pixel are non-valid, the decoder may conclude that the depth block is non-valid. When the depth block is non-valid, the decoder can ignore that block and need not decode the corresponding texture block (i.e., all texture blocks that are fully covered by the non-valid depth block).

The above described procedure may be repeated for all pixels/blocks of the volumetric video.

The usage of the threshold instead of the exact value in the comparisons may be beneficial at the decoder side because encoding, transmission and/or decoding may not be lossless, wherein a value of a parameter/variable after decoding may not be exactly the same than before encoding. Hence, small variations during the delivery of the information may not affect the end result and the decoder may still be able to end up the correct outcome.

In accordance with an embodiment, the following operations may also be performed at the decoder side. A depth picture, which may also be called as a depth plane, is initialized to default values. The default value may be, for example, a zero value, a maximum depth value, a minimum depth value, or some other predetermined value. A texture picture, which may also be called as a texture plane, may also be initialized to default values. The default values for the texture picture may be different from the default values for the depth picture.

The decoder may then decode the depth picture, wherein locations of the depth picture which contain projection data of the object, receive a corresponding depth value and locations which do not contain projection data of the object, remain in the default value.

After decoding the depth picture, the decoded depth picture is examined to determine which pixels of the depth picture have received some value during the construction of the depth picture, meaning that a point of the object has been projected to that pixel (a point in the projection surface). The examination may be performed, for example, so that each value in the depth picture is compared with the default value and if the comparison reveals that the value of the depth picture is equal to the default value, or only deviates from the default value less than a threshold, it is then determined that such a pixel does not contain any projection data and need not be decoded by the decoder. Moreover, such pixel will not be reconstructed into 3D space.

In an embodiment, a decoder decodes certain syntax elements and concludes from a particular set of syntax element values that decoding of texture blocks corresponding to non-valid depth blocks is not required. For example, if a block-wise indication, such as the CBP, is used, the decoder may examine the CBP value of the block and if it is equal to the above mentioned specific value, the decoder can deduce that this block need not be decoded.

It should be noted that it may also be possible to combine two or more of the above-mentioned embodiments.

In the above, some embodiments have been described with reference to encoding. It needs to be understood that said encoding may comprise one or more of the following: encoding source image data into a bitstream, encapsulating the encoded bitstream in a container file and/or in packet(s) or stream(s) of a communication protocol, and announcing or describing the bitstream in a content description, such as the Media Presentation Description (MPD) of ISO/IEC 23009-1 (known as MPEG-DASH) or the IETF Session Description Protocol (SDP). Similarly, some embodiments have been described with reference to decoding. It needs to be understood that said decoding may comprise one or more of the following: decoding image data from a bitstream, decapsulating the bitstream from a container file and/or from packet(s) or stream(s) of a communication protocol, and parsing a content description of the bitstream, In the above, some embodiments have been described with reference to encoding or decoding texture pictures, geometry pictures (e.g. depth pictures), and/or projection geometry information into or from a single bitstream. It needs to be understood that embodiments can be similarly realized when encoding or decoding texture pictures, geometry pictures, and/or projection geometry information into or from several bitstreams that are associated with each other, e.g. by metadata in a container file or media presentation description for streaming.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, Long Term Evolution wireless communication technique (LTE) and any similar wireless communication technology. A communications device involved in implementing various embodiments of the present invention may communicate using various media including, but not limited to, radio, infrared, laser, cable connections, and any suitable connection.

Although the above examples describe embodiments of the invention operating within a wireless communication device, it would be appreciated that the invention as described above may be implemented as a part of any apparatus comprising a circuitry in which radio frequency signals are transmitted and received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
   obtaining two or more patches formed from a three-dimensional image information, each patch representing projection data of at least a part of an object to a projection plane;
   determining for each of the two or more patches a rectangle totally covering the patch;
   determining a sorting criterion on the basis of at least one of a width and a height of the rectangle;
   sorting the patches on the basis of the sorting criteria of the rectangles determined for the two or more patches;
   selecting an initial size of a grid on the basis of one or more of the largest rectangles;
   inserting the two or more patches into the grid; and
   encoding the grid into a bitstream.

2. The method according to claim 1 further comprising:
   using as the sorting criteria one or more of the following:
   a surface area of the rectangle,
   the width of the rectangle, and
   the height of the rectangle.

3. The method according to claim 1 further comprising:
   selecting the initial size of the grid on the basis of the largest rectangle and the second largest rectangle.

4. The method according to claim 3 further comprising:
   selecting the initial width of the grid on the basis of the width of the largest rectangle; and
   selecting the initial height of the grid as the sum of the height of the largest rectangle and the width of the second largest rectangle.

5. The method according to claim 1 further comprising:
   if a patch to be inserted into the grid does not fit in the grid, increasing the size of the grid.

6. The method according to claim 1 further comprising:
   if a patch to be inserted into the grid does not fit in the grid, examining whether the grid comprises an unoccupied area large enough for the grid to be inserted, and if so, inserting the patch to the unoccupied area.

7. The method according to claim 1 further comprising:
   sorting the two or more patches from the patch having the largest area to the patch having the smallest area;
   defining a preliminary grid size based on the width and height of the two largest patches;
   putting the largest patch horizontally on the top of the grid and the second largest patch vertically on the left; and
   repeating the process with following patches in the sorted list.

8. The method according to claim 1 further comprising:
   selecting a geometrical shape of the grid from one of the following:
   a rectangle,
   a diamond, or
   a parallelogram.

9. An apparatus comprising at least one processor and at least one memory, said at least one memory stored with code thereon, which when executed by said at least one processor, causes the apparatus to perform at least:

obtain two or more patches formed from a three-dimensional image information, each patch representing projection data of at least a part of an object to a projection plane;
determine for each of the two or more patches a rectangle totally covering the patch;
determine a sorting criteria on the basis of a width and a height of the rectangle;
sort the patches on the basis of the sorting criteria of the rectangles determined for the two or more patches;
select an initial size of a grid on the basis of one or more of the largest rectangles;
insert the two or more patches into the grid; and
encode the grid into a bitstream.

10. The apparatus according to claim 9, said at least one memory stored with code thereon, which when executed by said at least one processor, further causes the apparatus to perform:
use as the sorting criteria one or more of the following:
a surface area of the rectangle,
the width of the rectangle,
the height of the rectangle.

11. The apparatus according to claim 9, said at least one memory stored with code thereon, which when executed by said at least one processor, further causes the apparatus to perform:
select the initial size of the grid on the basis of the largest rectangle and the second largest rectangle.

12. The apparatus according to claim 9, said at least one memory stored with code thereon, which when executed by said at least one processor, further causes the apparatus to perform:
select the initial width of the grid on the basis of the width of the largest rectangle; and
select the initial height of the grid as the sum of the height of the largest rectangle and the width of the second largest rectangle.

13. A method comprising:
receiving a bitstream comprising a grid filled with two or more patches formed from a three-dimensional image information, each patch representing projection data of at least a part of an object to a projection plane;
decoding from the bitstream information of the grid and the two or more patches;
reconstructing the grid;
reconstructing the two of more patches from the grid; and
reconstructing three-dimensional image from the two or more patches.

14. The method according to claim 13 further comprising:
obtaining from the decoded information:
a size of the grid; and
size and location of each patch in the grid.

15. The method according to claim 14 further comprising:
obtaining from the decoded information of orientation of each patch in the grid.

16. The method according to claim 13 further comprising:
obtaining from the decoded information of a geometrical shape of the grid.

17. An apparatus comprising at least one processor and at least one memory, said at least one memory stored with code thereon, which when executed by said at least one processor, causes the apparatus to perform at least:
decode from the bitstream information of the grid and the two or more patches;
reconstruct the grid;
reconstruct the two of more patches from the grid; and
reconstruct three-dimensional image from the two or more patches.

18. The apparatus according to claim 17, said at least one memory stored with code thereon, which when executed by said at least one processor, further causes the apparatus to perform:
obtain from the decoded information:
a size of the grid; and
size and location of each patch in the grid.

19. The apparatus according to claim 17, said at least one memory stored with code thereon, which when executed by said at least one processor, further causes the apparatus to perform:
obtain from the decoded information of orientation of each patch in the grid.

20. The apparatus according to claim 17, said at least one memory stored with code thereon, which when executed by said at least one processor, further causes the apparatus to perform:
obtain from the decoded information of a geometrical shape of the grid.

* * * * *